United States Patent
Furukawa

(10) Patent No.: US 12,233,964 B2
(45) Date of Patent: Feb. 25, 2025

(54) POWER CONVERSION DEVICE AND ELECTRIC POWER STEERING DEVICE

(71) Applicant: Mitsubishi Electric Corporation, Tokyo (JP)

(72) Inventor: Akira Furukawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 212 days.

(21) Appl. No.: 17/908,168

(22) PCT Filed: Jun. 16, 2020

(86) PCT No.: PCT/JP2020/023528
§ 371 (c)(1),
(2) Date: Aug. 30, 2022

(87) PCT Pub. No.: WO2021/255813
PCT Pub. Date: Dec. 23, 2021

(65) Prior Publication Data
US 2023/0117922 A1    Apr. 20, 2023

(51) Int. Cl.
*B62D 5/04*    (2006.01)
*H02P 6/10*    (2006.01)

(52) U.S. Cl.
CPC ............ *B62D 5/046* (2013.01); *H02P 6/10* (2013.01)

(58) Field of Classification Search
CPC .......... B62D 5/046; H02P 6/10; H02P 27/08; H02M 7/53873; H02M 7/5395; H02M 1/0009

(Continued)

(56) References Cited

U.S. PATENT DOCUMENTS

| 7,088,063 | B2* | 8/2006 | Kurosawa | ............... | G11B 19/28 |
| | | | | | 318/599 |
| 9,503,011 | B2* | 11/2016 | Kurosawa | ................. | H02P 6/10 |

(Continued)

FOREIGN PATENT DOCUMENTS

| EP | 3 439 163 A1 | 2/2019 |
| EP | 3 651 339 A1 | 5/2020 |

(Continued)

OTHER PUBLICATIONS

Extended European Search Report issued Jun. 22, 2023 in application No. 20940658.6.

(Continued)

*Primary Examiner* — David Luo
(74) *Attorney, Agent, or Firm* — Sughrue Mion, PLLC

(57) ABSTRACT

A first offset correction and a second offset correction are switched between in a cycle $T_c$ shorter than an electrical angle cycle of an alternating current rotating machine, the first offset correction is such that a first shift amount is fixed in such a way as to obtain an applied voltage such that at least n−2 phases among phase currents of the alternating current rotating machine can be detected, and the applied voltage is calculated by the first shift amount being subtracted equally from all voltage commands, and the second offset correction is such that a second shift amount is fixed in such a way that a sign of an average value in an electrical angle cycle is reversed with respect to that of an average value in an electrical angle cycle of the first shift amount, and the applied voltage is calculated by the second shift amount being subtracted equally from all the voltage commands.

20 Claims, 26 Drawing Sheets

(58) Field of Classification Search
USPC .................. 318/811, 810, 807, 767, 727
See application file for complete search history.

(56) References Cited

U.S. PATENT DOCUMENTS

| | | |
|---|---|---|
| 2012/0194109 A1 | 8/2012 | Uryu et al. |
| 2012/0206075 A1 | 8/2012 | Kimpara et al. |
| 2018/0022378 A1 | 1/2018 | Furukawa |
| 2019/0058418 A1 | 2/2019 | Mori et al. |
| 2020/0153375 A1 | 5/2020 | Mori et al. |

FOREIGN PATENT DOCUMENTS

| | | |
|---|---|---|
| JP | 2006-230079 A | 8/2006 |
| JP | 2007-306705 A | 11/2007 |
| JP | 2009-017671 A | 1/2009 |
| JP | 2012-161154 A | 8/2012 |
| JP | 2012-170277 A | 9/2012 |
| JP | 2020-068587 A | 4/2020 |
| WO | 2016/143121 A1 | 9/2016 |

OTHER PUBLICATIONS

Japanese Office Action issued Oct. 31, 2023 in Patent Application No. 2022-531131.
International Search Report for PCT/JP2020/023528 dated, Sep. 8, 2020.
European Office Action issued Oct. 29, 2024 in Patent Application No. 20 940 658.6.
Communication dated Nov. 11, 2024 in Chinese Application No. 202080101883.9.

\* cited by examiner

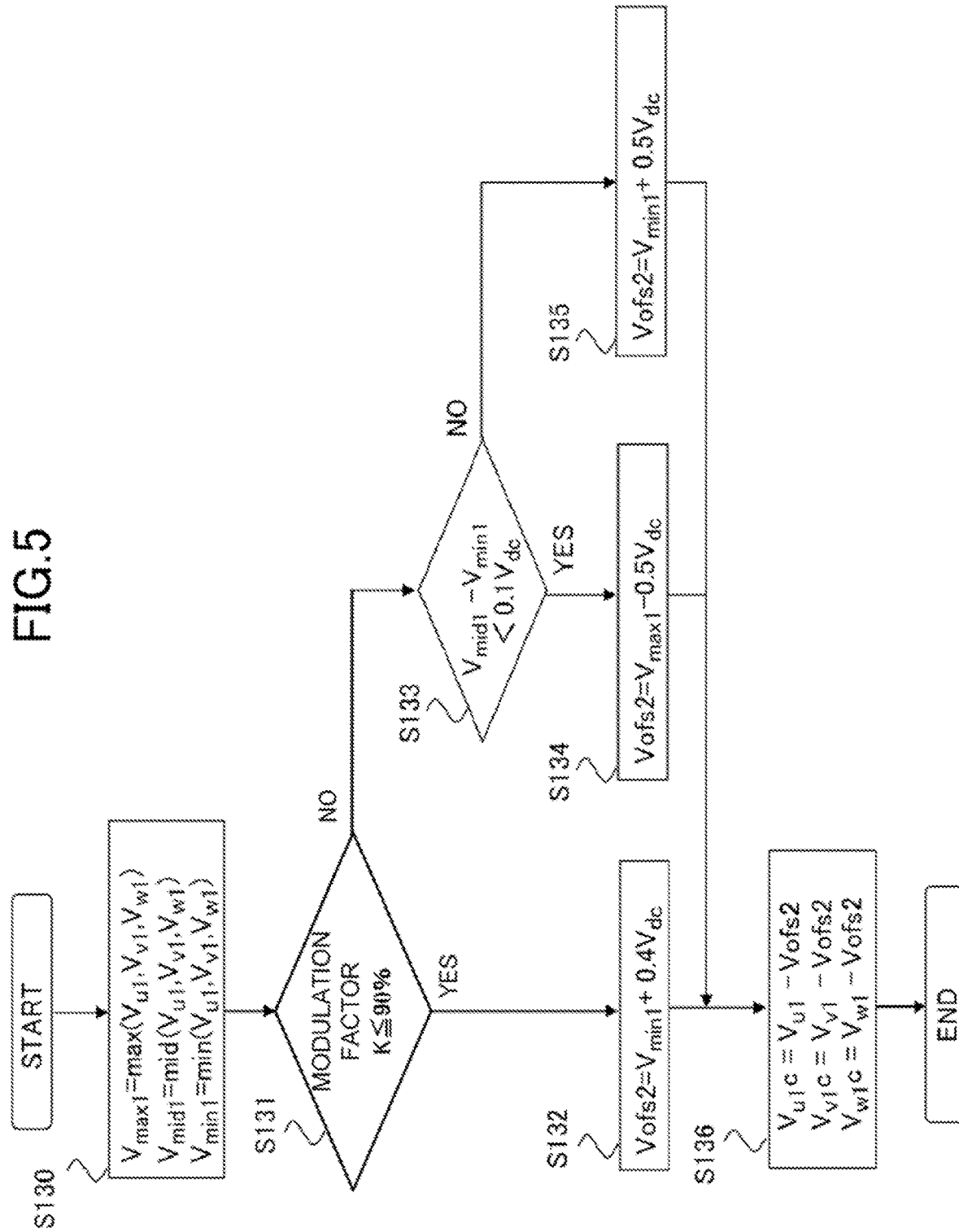

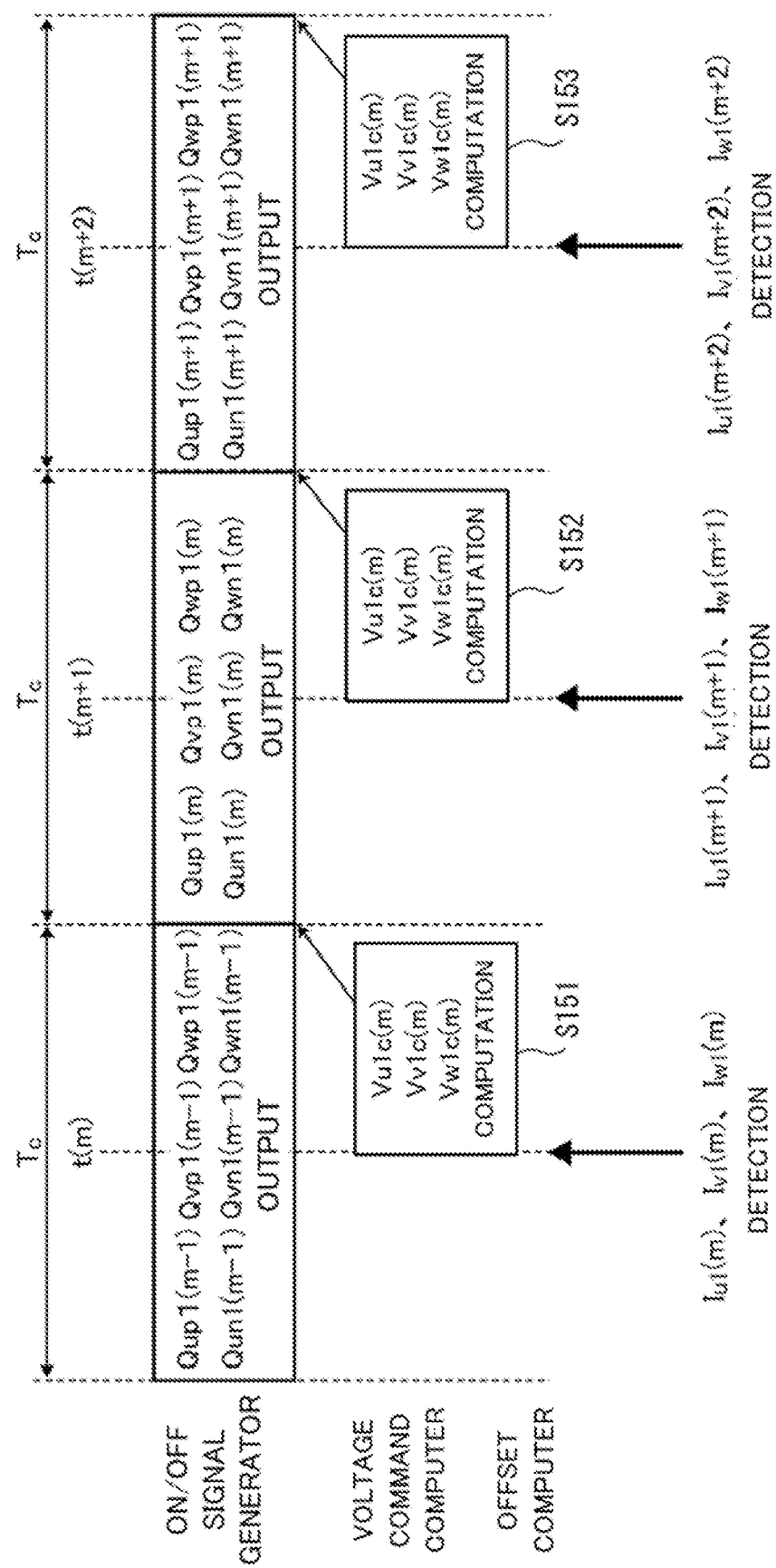

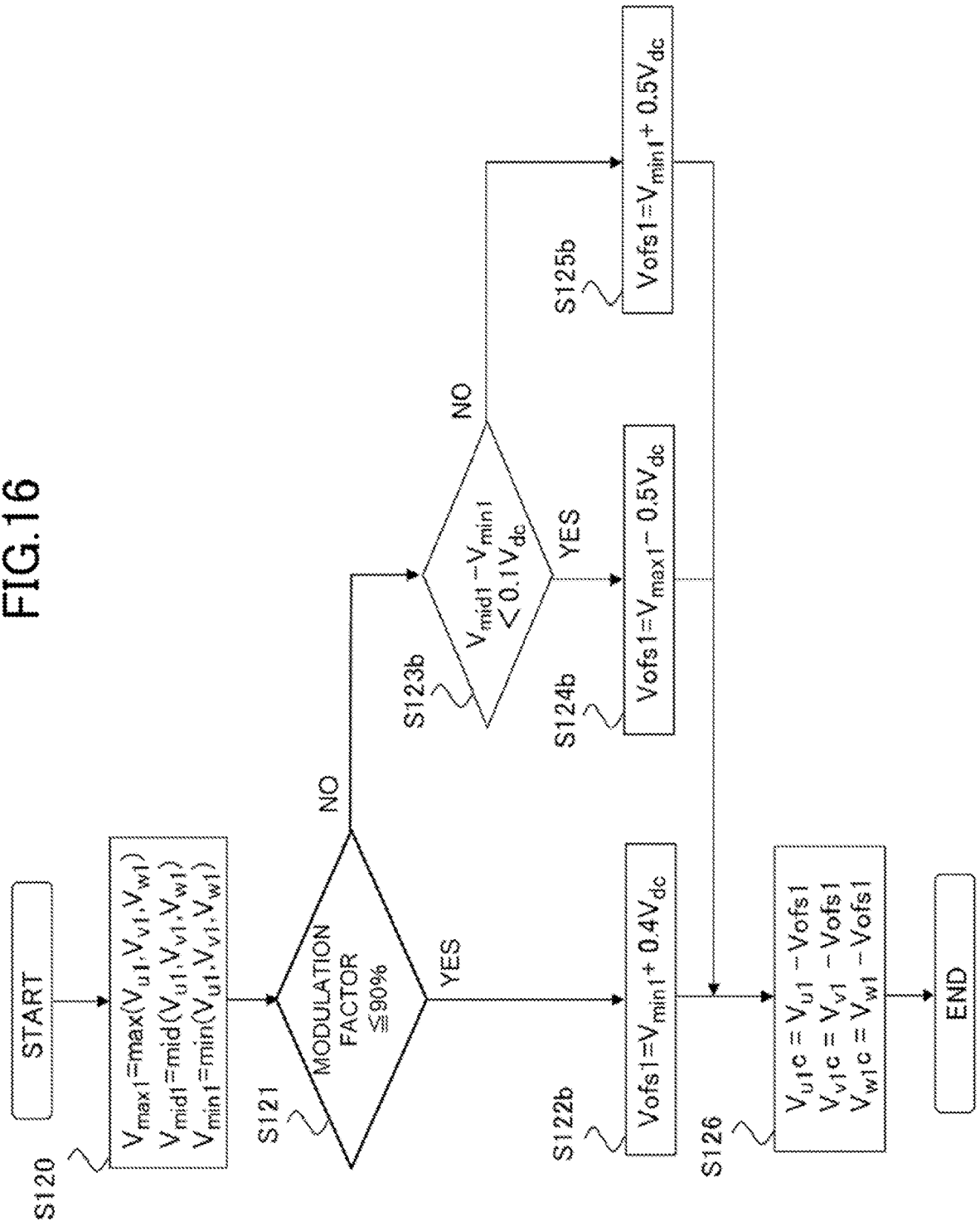

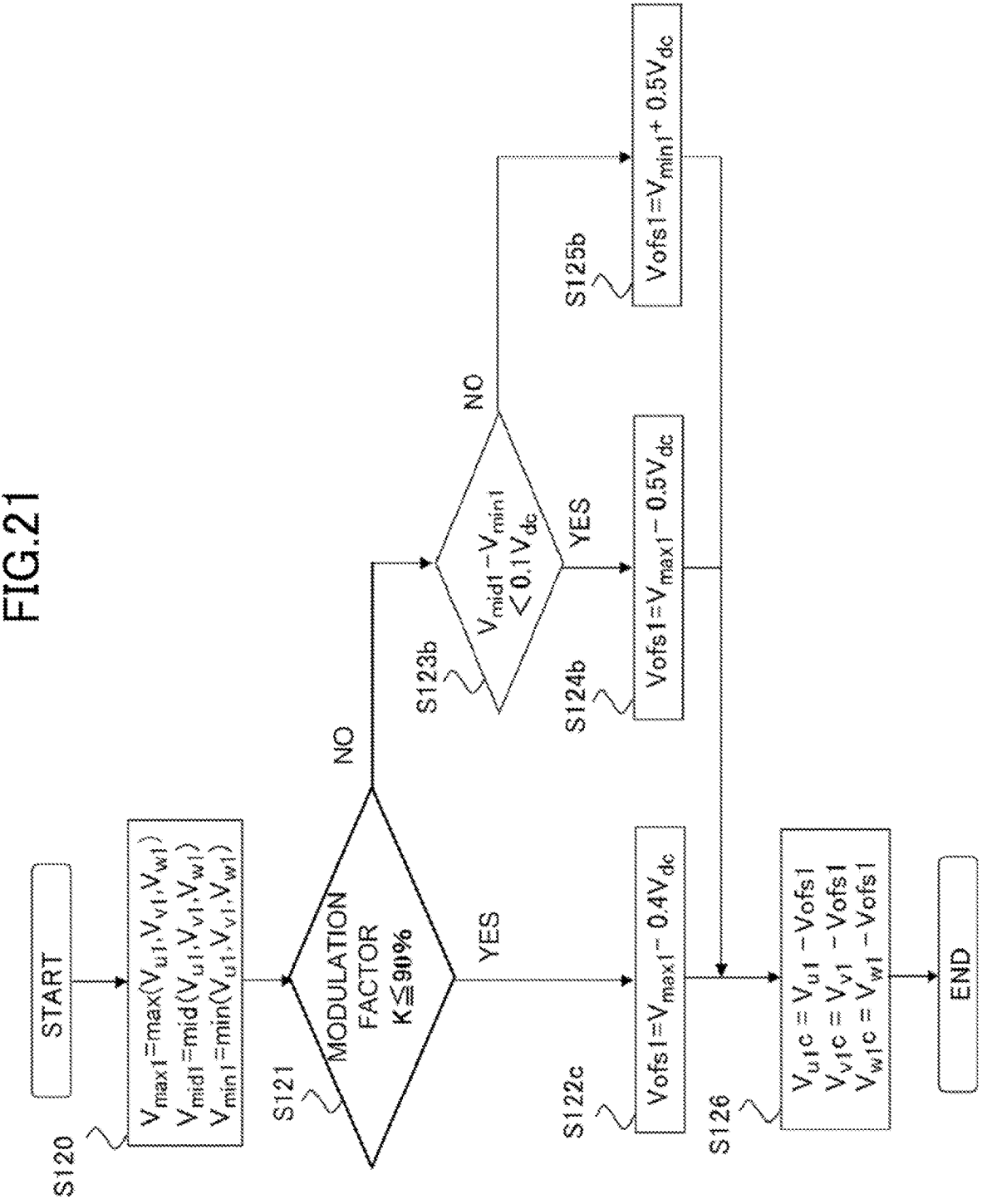

POWER CONVERSION DEVICE AND ELECTRIC POWER STEERING DEVICE

CROSS REFERENCE TO RELATED APPLICATIONS

This application is a National Stage of International Application No. PCT/JP2020/023528 filed Jun. 16, 2020.

TECHNICAL FIELD

The present application relates to the field of a power conversion device and to an electric power steering device.

BACKGROUND ART

To date, a power conversion device such as an inverter has been used in a motor control device used in, for example, an electric power steering device.

A power conversion device such that power loss caused by a current detecting shunt resistor or a switching element can be reduced is disclosed in, for example, Patent Literature 1. In Patent Literature 1, power loss in a shunt resistor is reduced by a three-phase voltage command being shifted in a positive direction. Also, current detection accuracy is secured by a duty ratio of a maximum phase, wherein a current becomes undetectable before a current detecting time is reached, being fixed at 100%, and current detection being carried out using the other two phases.

Also, a power conversion device such that a voltage command shift direction is changed depending on whether a steering wheel with which a vehicle is equipped is steered to the left or steered to the right, whereby a difference in on-state times between switching elements is reduced, and an imbalance of heat loss between switching elements is reduced, is disclosed in, for example, Patent Literature 2.

Furthermore, a PWM amplifier such that a peak value and an effective value of an input current are small, without increasing a circuit scale, is disclosed in, for example, Patent Literature 3, and technology such that biasing signals of a first shaft PWM amplifier and a second shaft PWM amplifier are exchanged every predetermined cycle of a triangular wave, because of which there is no restrictive effect of an on-state time of a transistor configuring an upper side arm or a lower side arm, is disclosed.

CITATION LIST

Patent Literature

Patent Literature 1: JP-A-2009-17671
Patent Literature 2: JP-A-2012-161154
Patent Literature 3: JP-A-2007-306705
Patent Literature 4: JP-A-2012-170277
Patent Literature 4: WO2016/143121A1

SUMMARY OF INVENTION

Technical Problem

The power conversion device disclosed in Patent Literature 1 is such that a three-phase voltage command is shifted in a positive direction in order to reduce power loss in a shunt resistor. Although power loss in a shunt resistor can be reduced by using this method, conduction loss in a high potential side switching element is high with respect to conduction loss in a low potential side switching element.

When a shunt resistor is compared to a switching element, it is often the case that thermal resistance is low. Also, even when thermal resistance is the same, heat generated by a shunt resistor can be restricted by using a non-contact current detector instead of a shunt resistor. In such a case, the method of Patent Literature 1, wherein an imbalance occurs in states of heat generation in an upper side arm and a lower side arm, is such that even when there is leeway in the temperature of a low potential side switching element, there is a limit to a function of overheating protection due to a rise in the temperature of a high potential side switching element, wherein a large amount of heat is generated.

Also, the power conversion device disclosed in Patent Literature 2 is such that a difference occurs in current detection accuracy in a region of a high modulation factor according to a direction in which a shift is made, because of which there is a problem in that noise or vibration worsens in one winding phase. Also, as a shift direction of a voltage command of each winding phase is switched in accordance with a steering torque direction, an imbalance in heat generation occurs when a state wherein a fixed direction of steering torque is input continues when the steering wheel is locked.

Furthermore, the PWM amplifier disclosed in Patent Literature 3 is such that although biasing signals are switched, there is a problem in that when, for example, current detection is carried out using a current detector inserted in series with a low potential side switching element, current can be detected without problem when a biasing signal is applied in a negative direction, but phases in which current cannot be detected increase when a biasing signal is applied in a positive direction in comparison with when no biasing signal is applied.

The present application has been made to solve the above problem, and an object of the present application is to provide a power conversion device and an electric power steering device such that an imbalance in amounts of heat generated is eliminated while securing current detection accuracy.

Solution to Problem

A power conversion device disclosed in the present application includes a direct current power supply that outputs a direct current voltage, connected to an alternating current rotating machine having n-phase windings, wherein n is three or more, and is characterized by including a power converter that has high potential side switching elements and low potential side switching elements, controls switching of the high potential side switching elements and the low potential side switching elements based on on/off signals, converts the direct current voltage into an alternating current voltage, and applies the alternating current voltage to the n-phase windings, a current detector that is inserted in series with the high potential side switching elements or the low potential side switching elements and obtains a detected current of each phase, and a control circuitry that computes a voltage command based on a current command of the alternating current rotating machine, and outputs the on/off signals by comparing an applied voltage, obtained by a first offset correction and a second offset correction with respect to the voltage command, and a carrier signal, wherein the control circuitry switches between the first offset correction and the second offset correction in a cycle shorter than an electrical angle cycle of the alternating current rotating machine, the first offset correction is such that a first shift amount is fixed in such a way as to obtain an applied voltage such that at least n−2 phases among phase currents of the alternating current rotating machine can be detected, and the applied voltage is calculated by the first shift amount being subtracted equally from all the voltage commands, and the second offset correction is such that a second shift amount is fixed in such a way that a sign of an average value in an electrical angle cycle is reversed with respect to that of an average value in an electrical angle cycle of the first shift amount, and the applied voltage is calculated by the second shift amount being subtracted equally from all the voltage commands.

Advantageous Effects of Invention

The power conversion device disclosed in the present application can provide a power conversion device such that an imbalance in amounts of heat generated is eliminated, while securing current detection accuracy.

BRIEF DESCRIPTION OF DRAWINGS

FIG. 5 is a flowchart illustrating a computation of a second offset correction in the power conversion device according to the first embodiment.

FIG. 13 is a drawing showing operation timings of a voltage command computer, an offset computer, and the on/off signal generator used in the power conversion device according to the first embodiment.

FIG. 16 is a flowchart illustrating a computation of a first offset correction in the power conversion device according to the second embodiment.

FIG. 21 is a flowchart illustrating another computation of the first offset correction in the power conversion device according to the second embodiment.

DESCRIPTION OF EMBODIMENTS

Figure 1:
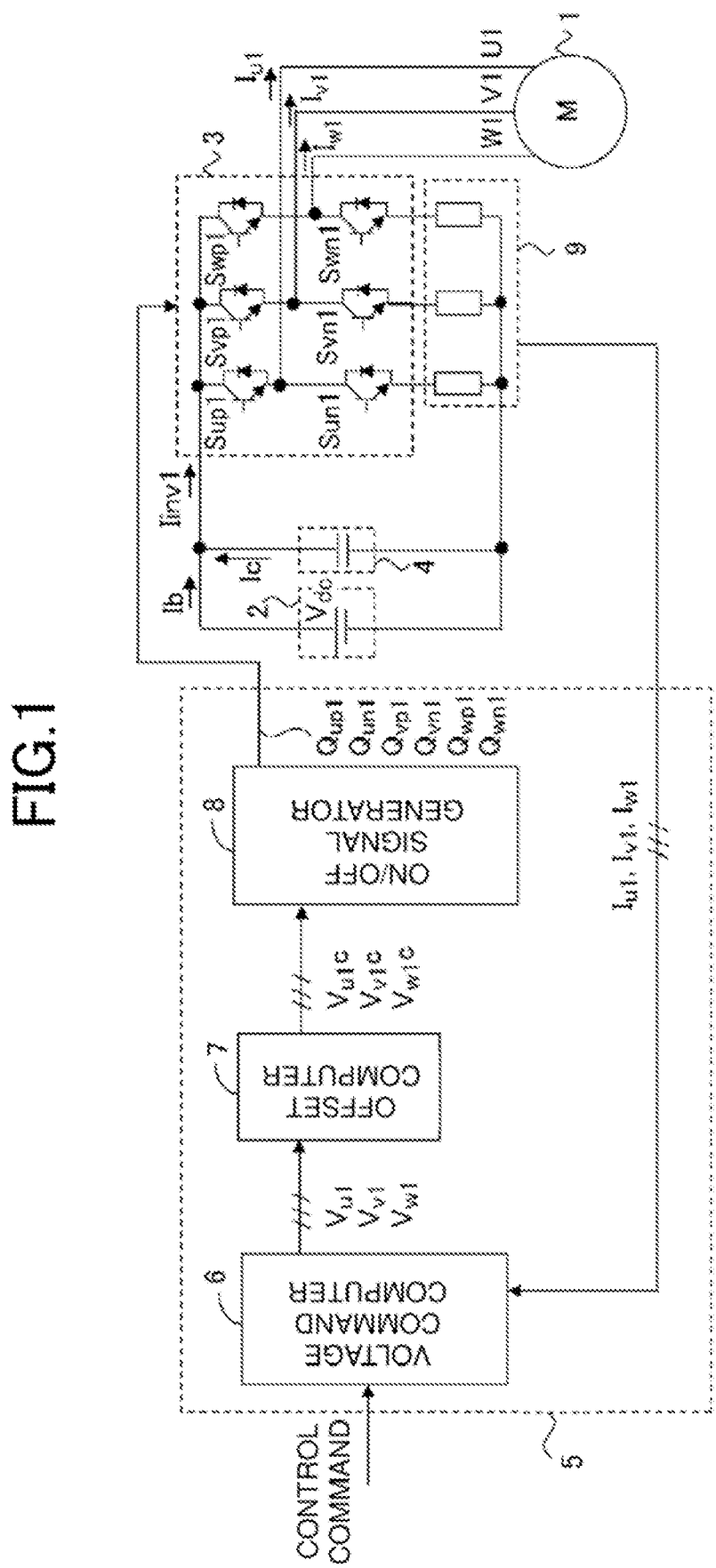
FIG. 1 is an overall configuration drawing wherein an alternating current rotating machine is controlled by a power conversion device according to a first embodiment.

Hereafter, embodiments of the present application will be described, while referring to the drawings. Identical or corresponding portions in the drawings will be described with identical reference signs allotted.

First Embodiment

FIG. 1 is an overall configuration drawing wherein an alternating current rotating machine is controlled by a power conversion device according to a first embodiment.

In FIG. 1, an alternating current rotating machine 1 is a three-phase alternating current rotating machine wherein three-phase windings U1, V1, and W1 are housed in a stator of the rotating machine. Although a permanent magnet synchronous rotating machine, an induction rotating machine, a synchronous reluctance rotating machine, or the like, can be cited as an alternating current rotating machine, the present embodiment is such that any rotating machine may be used provided that the rotating machine is an alternating current rotating machine that has n-phase windings, wherein n is three or more.

A direct current power supply 2 outputs a direct current voltage $V_{dc}$ to a power converter 3. All items of equipment that output a direct current voltage, such as a battery, a DC-DC converter, a diode rectifier, or a PWM rectifier, are included as the direct current power supply 2.

A smoothing capacitor 4 is connected in parallel to the direct current power supply 2, and realizes a stable direct current by restricting a fluctuation in a bus current. Although not shown in detail here, an equivalent series resistance Rc and a lead inductance Lc exist in addition to a true capacitor capacitance C.

The power converter 3, using an inverter, turns high potential side switching elements Sup1, Svp1, and Swp1 and low potential side switching elements Sun1, Svn1, and Swn1 on and off, based on on/off signals Qup1, Qun1, Qvp1, Qvn1, Qwp1, and Qwn1, thereby converting the direct current voltage $V_{dc}$ input from the direct current power supply 2 and applying voltage to the three-phase windings U1, V1, and W1 of the alternating current rotating machine 1, and supplying currents $I_{u1}$, $I_{v1}$, and $I_{w1}$. Herein, the on/off signal Qup1 is a signal that turns the high potential side switching element Sup1 of the power converter 3 on and off, and the on/off signal Qun1 is a signal that turns the low potential side switching element Sun1 of the power converter 3 on and off. Also, the on/off signal Qvp1 is a signal that turns the high potential side switching element Svp1 of the power converter 3 on and off, and the on/off signal Qvn1 is a signal that turns the low potential side switching element Svn1 of the power converter 3 on and off. Furthermore, the on/off signal Qwp1 is a signal that turns the high potential side switching element Swp1 of the power converter 3 on and off, and the on/off signal Qwn1 is a signal that turns the low potential side switching element Swn1 of the power converter 3 on and off. Hereafter, it will be assumed that when a value of the on/off signals Qup1, Qun1, Qvp1, Qvn1, Qwp1, and Qwn1 is 1, a signal that turns the corresponding switching element on is output, while when the value thereof is 0, a signal that turns the corresponding switching element off is output. A switching element wherein a semiconductor switch and a diode are connected in anti-parallel, such as an IGBT, a bipolar transistor, or a MOS power transistor, is used as the switching elements Sup1, Svp1, Swp1, Sun1, Svn1, and Swn1.

A control unit 5 includes a voltage command computer 6, an offset computer 7, and an on/off signal generator 8. The voltage command computer 6 computes three-phase voltage commands $V_{u1}$, $V_{v1}$, and $V_{w1}$, which are voltages applied to the three-phase windings U1, V1, and W1 that drive the alternating current rotating machine 1, and outputs the voltage commands $V_{u1}$, $V_{v1}$, and $V_{w1}$ to the offset computer 7. As a method of computing the three-phase voltage commands $V_{u1}$, $V_{v1}$, and $V_{w1}$, a current command of the alternating current rotating machine 1 is set as a control command, and a current feedback control, or the like, wherein the three-phase voltage commands $V_{u1}$, $V_{v1}$, and $V_{w1}$ are computed using proportional-integral control, is used in such a way that a deviation detected by a current detector 9, to be described hereafter, in the currents $I_{u1}$, $I_{v1}$, and $I_{w1}$ flowing through the three-phase windings U1, V1, and W1 is zero. As this kind of control is publicly known technology, a detailed description will be omitted.

The offset computer 7, based on the three-phase voltage commands $V_{u1}$, $V_{v1}$, and $V_{w1}$, computes three-phase applied voltages $V_{u1}c$, $V_{v1}c$, and $V_{w1}c$ in accordance with a first offset correction and a second offset correction. The first offset correction is such that a first shift amount Vofs1 is fixed in such a way as to obtain an applied voltage such that at least one phase of current among the three phases of current can be detected, and three-phase applied voltages $V_{u11}c$, $V_{v11}c$, and $V_{w11}c$ are obtained by subtracting the first shift amount Vofs1 from the three-phase voltage commands $V_{u1}$, $V_{v1}$, and $V_{w1}$. The second offset correction is such that a second shift amount Vofs2 is fixed in such a way that a sign of an average value in an electrical angle cycle is the reverse of that of an average value in an electrical angle cycle of the first shift amount Vofs1, and three-phase applied voltages $V_{u12}c$, $V_{v12}c$, and $V_{w12}c$ are obtained by subtracting the second shift amount Vofs2 from the three-phase voltage commands $V_{u1}$, $V_{v1}$, and $V_{w1}$. Further, the three-phase applied voltages $V_{u11}c$, $V_{v11}c$, and $V_{w11}c$ obtained by the first offset correction or the three-phase applied voltages $V_{u12}c$, $V_{v12}c$, and $V_{w12}c$ obtained by the second offset correction are output as the three-phase applied voltages $V_{u1}c$, $V_{v1}c$, and $V_{w1}c$.

Hereafter, the three-phase voltage commands $V_{u1}$, $V_{v1}$, and $V_{w1}$ will be described as, in order of decreasing magnitude, a maximum phase three-phase voltage command $V_{max1}$ (hereafter called the maximum phase $V_{max1}$), an intermediate phase three-phase voltage command $V_{mid1}$ (hereafter called the intermediate phase $V_{mid1}$), and a minimum phase three-phase voltage command $V_{min1}$ (hereafter called the minimum phase $V_{min1}$), and the three-phase applied voltages $V_{u1}c$, $V_{v1}c$, and $V_{w1}c$ obtained by the offset corrections will be described as, in order of decreasing magnitude, a maximum phase corrected three-phase applied voltage $V_{max1}c$ (hereafter called the maximum phase $V_{max1}c$), an intermediate phase corrected three-phase applied voltage $V_{mid1}c$, and a minimum phase corrected three-phase applied voltage $V_{min1}c$ (hereafter called the minimum phase $V_{min1}c$).

The on/off signal generator 8 outputs the on/off signals Qup1, Qun1, Qvp1, Qvn1, Qwp1, and Qwn1 based on the three-phase applied voltages $V_{u1}c$, $V_{v1}c$, and $V_{w1}c$, and outputs on/off signals Qup2, Qun2, Qvp2, Qvn2, Qwp2, and Qwn2 based on second three-phase applied voltages $V_{u2}c$, $V_{v2}c$, and $V_{w2}c$.

Figure 2:
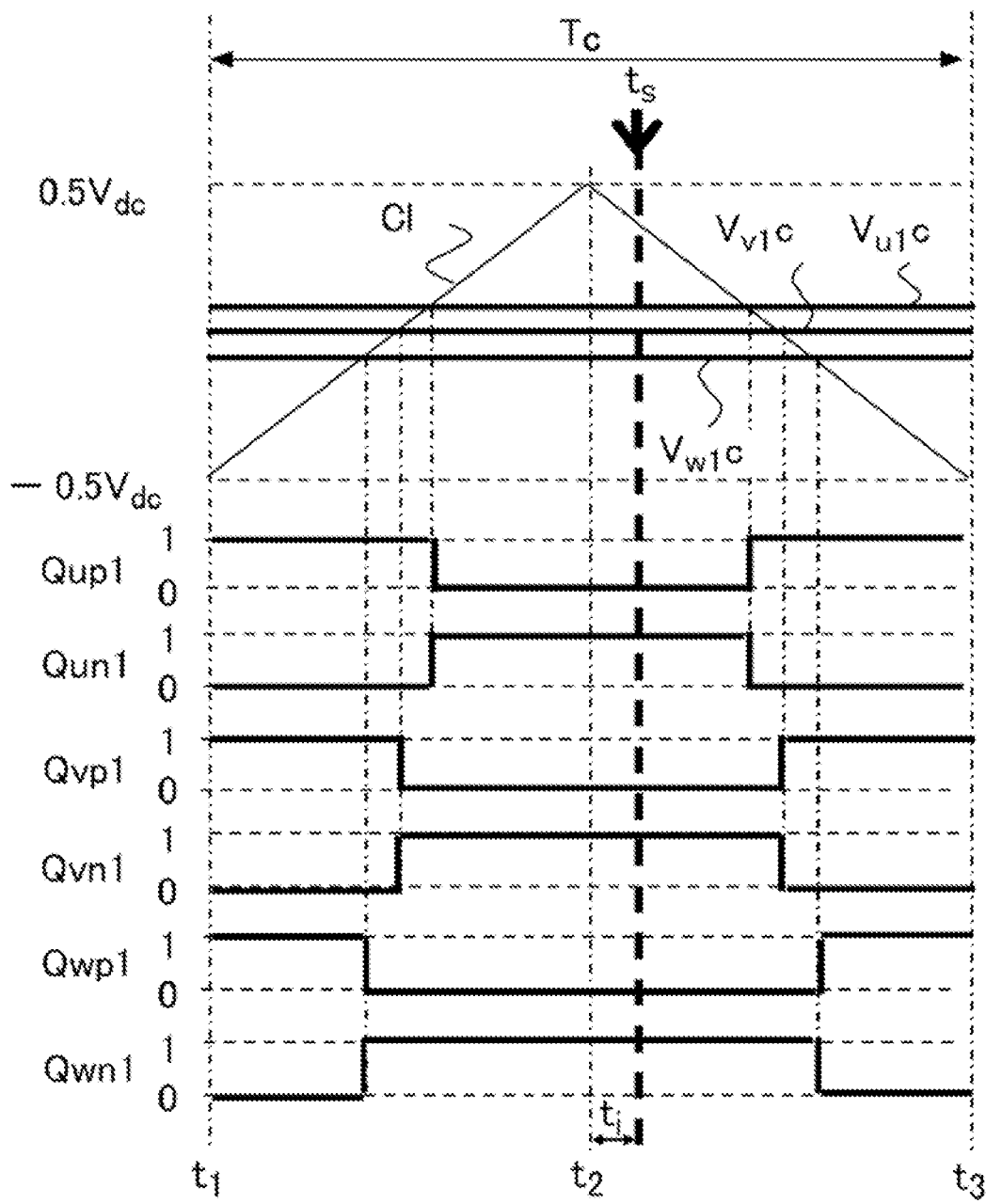
FIG. 2 is an illustration of an operation of an on/off signal generator used in the power conversion device according to the first embodiment.

FIG. 2 is an illustration of an operation of the on/off signal generator 8. In FIG. 2, reference sign C1 is a carrier signal, and is a triangular wave of a cycle $T_c$ having a minimum value $-0.5V_{dc}$ at a time $t_1$ and a time $t_3$ and a maximum value $0.5V_{dc}$ at a time $t_2$. The carrier signal C1 and the three-phase applied voltage $V_{u1}c$ are compared, "Qup1=1 and Qun1=0" are output when the three-phase applied voltage $V_{u1}c$ is greater, and "Qup1=0 and Qun1=1" are output when the three-phase applied voltage $V_{u1}c$ is smaller. In the same way, the carrier signal C1 and the three-phase applied voltage $V_{v1}c$ are compared, "Qvp1=1 and Qvn1=0" are output when the three-phase applied voltage $V_{v1}c$ is greater, and "Qvp1=0 and Qvn1=1" are output when the three-phase applied voltage $V_{v1}c$ is smaller. In the same way, the carrier signal C1 and the three-phase applied voltage $V_{w1}c$ are compared, "Qwp1=1 and Qwn1=0" are output when the three-phase applied voltage $V_{w1}c$ is greater, and "Qwp1=0 and Qwn1=1" are output when the three-phase applied voltage $V_{w1}c$ is smaller. A detection timing $t_s$ indicates a timing of current detection.

The current detector 9 is provided in series with each of the low potential side switching elements Sun1, Svn1, and Swn1 of the power converter 3, and detects the currents $I_{u1}$, $I_{v1}$, and $I_{w1}$ flowing through the three-phase windings U1, V1, and W1.

Herein, a time needed for the current detector 9 to detect current (a lower limit value of a time of energizing a current detecting resistance element fixed after considering a time for ringing included in a detected waveform to settle, an analog/digital converter conversion time, or a time needed for sampling and holding) is assumed to be $t_1$. In FIG. 2, in order for the current detector 9 to detect accurately at the detection timing $t_n$, it is necessary not to cause a switching from 0 to 1 or from 1 to 0 of the on/off signals Qup1, Qun1, Qvp1, Qvn1, Qwp1, and Qwn1 applied to the power converter 3 to occur in a period from $t_s - t_1$ to $t_n$. When this switching is caused to occur, noise becomes mixed in with the detected currents $I_{u1}$, $I_{v1}$, and $I_{w1}$, resultantly causing vibration or noise to occur from the alternating current rotating machine 1.

In order to be able to detect accurately when the detection timing $t_s$ is set to within $t_i/2$ after the time $t_2$, it is necessary that the following Expression (1) is satisfied with the maximum phase $V_{max1}c$ as the maximum value of the three-phase applied voltages $V_{u1}c$, $V_{v1}c$, and $V_{w1}c$. Herein, the reason for setting within $t_i/2$ is that when setting after this, there is an effect of noise generated by an on/off signal switching from 0 to 1 or from 1 to 0 after the time $t_2$.

$$V_{max}c < \left\{ \frac{2(t_s - t_i)}{T_c} - 0.5 \right\} V_{dc} \tag{1}$$

It is understood from Expression (1) that when the detection timing $t_s$ is set to within $t_i/2$ after the time $t_2$, the maximum phase applied voltage $V_{max}c$ can be set to be largest, and provided that the following Expression (2) is satisfied, the three phases of current can be detected at the detection timing $t_s$. Furthermore, a time needed for current disturbance caused by an effect of switching noise in other phases to settle may also be included when considering the time $t_i$, in which case current can be accurately detected in not only the maximum phase but in all phases by avoiding switching in the time $t_i$ centered on the detection timing.

By updating an on/off signal in a trough of the carrier signal C1, as in FIG. 2, an on/off signal that is approximately symmetrical centered on a peak of the carrier signal C1 can be realized, and it can be determined by applying voltage once whether or not current can be detected, which is preferred. When updating an on/off signal at a peak of the carrier signal C1, it is sufficient to determine whether or not current can be detected by considering two voltage applications, one either side of a peak of the carrier signal C1.

$$V_{max}c < \left( 0.5 - \frac{t_i}{T_c} \right) V_{dc} \tag{2}$$

The current detector 9 inserted in series with the low potential side switching elements Sun1, Svn1, and Swn1 is such that when a ratio with respect to the direct current voltage of the maximum value of an applied voltage such that current can be detected (hereafter referred to as a maximum applied voltage ratio) is $K_m$, current can be detected accurately when the applied voltage is $K_m V_{dc}$ (hereafter referred to as a maximum applied voltage) or less. Herein, $K_m$ satisfies the following Expression (3).

$$K_m < 0.5 - \frac{t_i}{T_c} \tag{3}$$

For example, when the cycle $T_c$ is 50 µs and the time $t_i$ needed for the current detector 9 to detect current is 4.9 µs, three phases of current can be detected when a modulation factor K such that the maximum phase $V_{max1}c$ can be modulated to $0.4V_{dc}$ or less is 90% or less. As the maximum phase $V_{max1}c$ is $0.4V_{dc}$ or greater in a region in which the modulation factor K exceeds 90%, the two phases other than the maximum phase can be detected, and the remaining phase can be obtained by estimation from the two detectable phases using a publicly known method.

Hereafter, a description will be given with a case wherein the maximum applied voltage ratio $K_m$ is 0.4 as an example.

Firstly, a computation of the first offset correction will be described.

Figure 3:
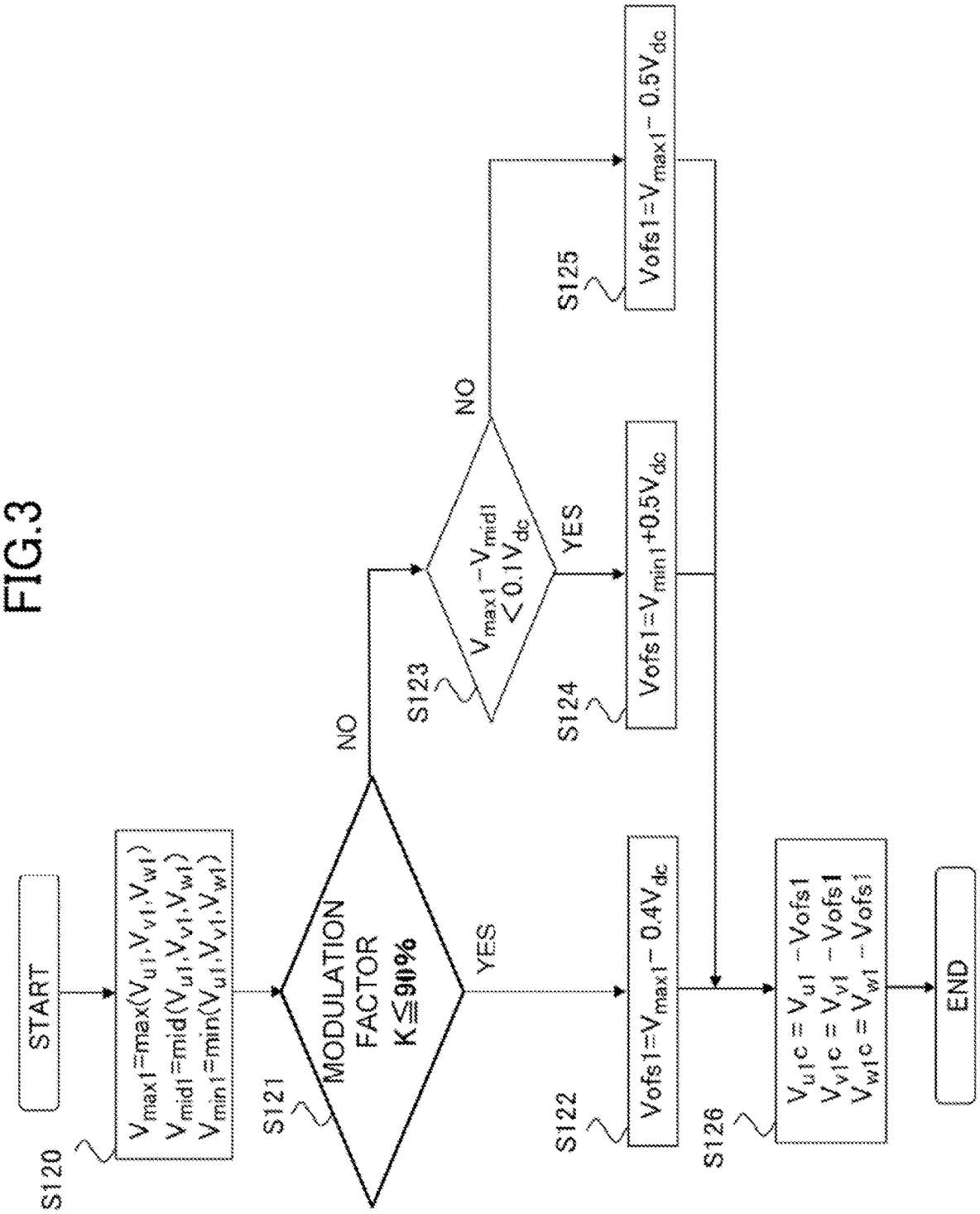
FIG. 3 is a flowchart illustrating a computation of a first offset correction in the power conversion device according to the first embodiment.

FIG. 3 is a flowchart illustrating a computation of the first offset correction. In FIG. 3, the three-phase voltage commands $V_{u1}$, $V_{v1}$, and $V_{w1}$, are substituted, in order of decreasing magnitude, for the maximum phase $V_{max1}$, the intermediate phase $V_{mid1}$, and the minimum phase $V_{min1}$ in step S120.

In step S121, it is determined whether the modulation factor K is 90% or less, step S122 is executed in the case of "Yes", and step S123 is executed in the case of "No". The determination may be carried out using a difference between the maximum phase $V_{max1}$ and the minimum phase $V_{min1}$, as shown in, for example, FIG. 8 of Patent Literature 4.

In step S122, the first shift amount Vofs1 is fixed in such a way that a maximum phase $V_{max}c$ of the three-phase applied voltages is equal to or less than $0.4V_{dc}$, wherein current can be detected.

In step S123, it is determined whether the difference between a maximum phase voltage command and an intermediate phase voltage command is less than $0.1V_d$, step S124 is executed in the case of "Yes", and step S125 is executed in the case of "No".

In step S124, the first shift amount Vofs1 is fixed in such a way that a minimum phase $V_{min}c$ of the three-phase applied voltages is $-0.5V_{dc}$, in order to maximize a time from a maximum phase switching to the detection timing $t_s$.

Figure 4A:
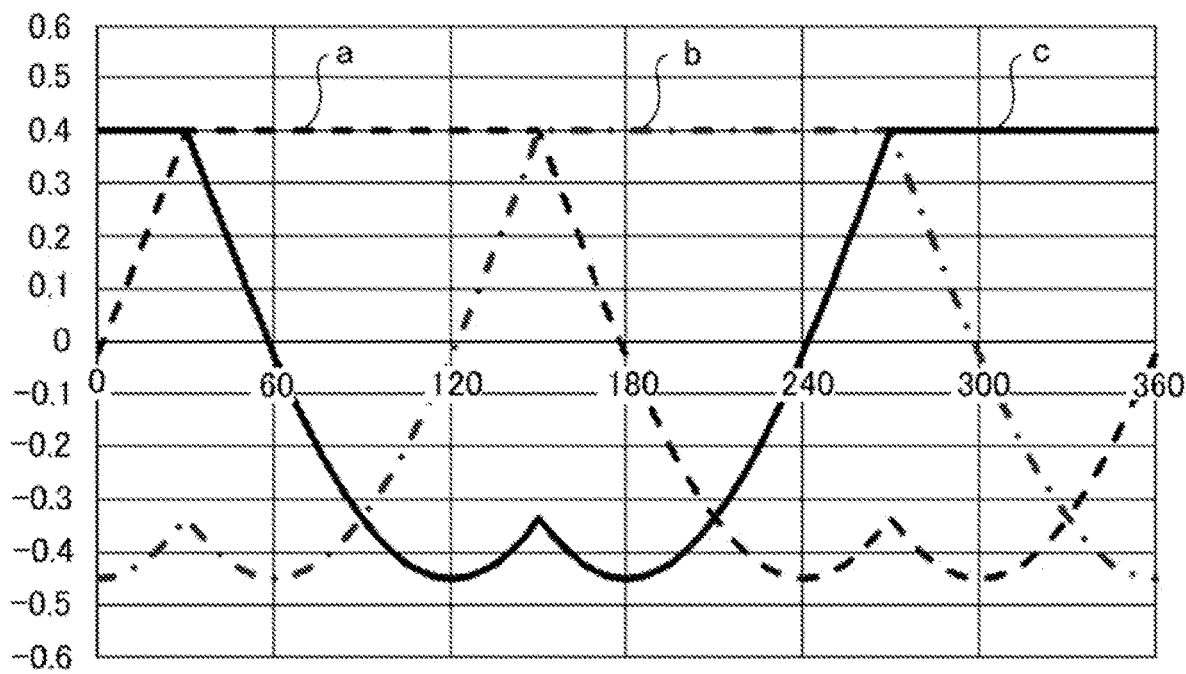
FIG. 4A is a drawing showing three-phase applied voltages wherein a modulation factor is 85% when fixing a first shift amount in the power conversion device according to the first embodiment.
Figure 4B:
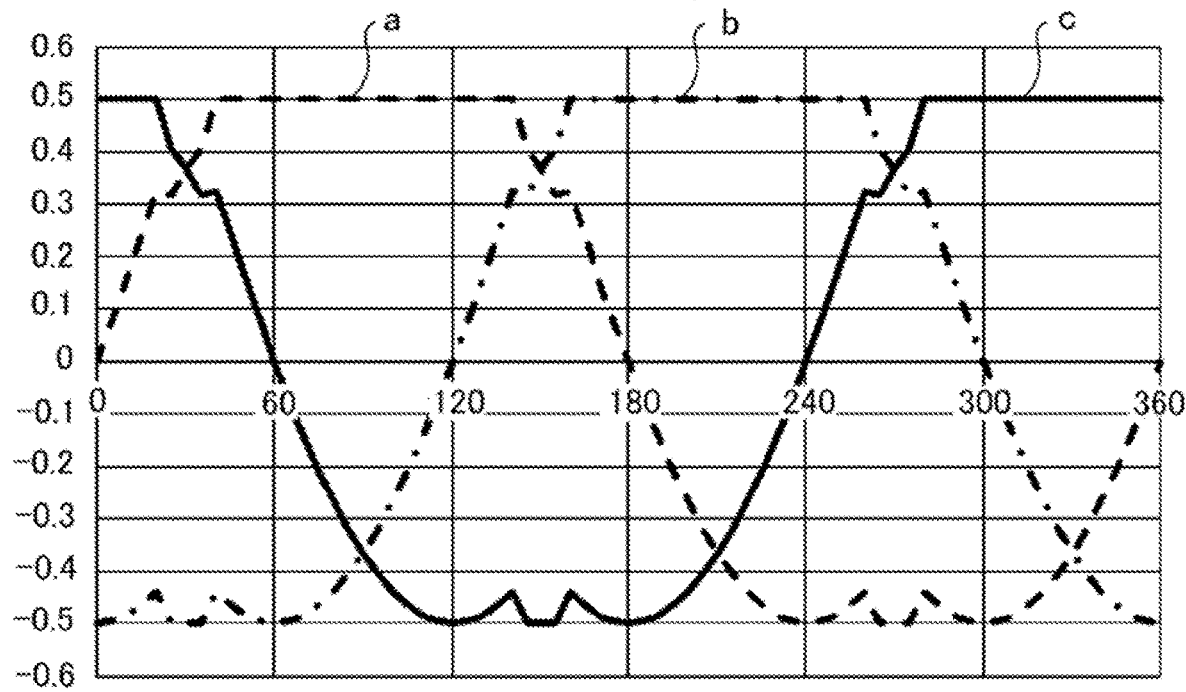
FIG. 4B is a drawing showing three-phase applied voltages wherein a modulation factor is 100% when fixing the first shift amount in the power conversion device according to the first embodiment.

In step S125, the first shift amount Vofs1 is fixed in such a way that the maximum phase $V_{max}c$ of the three-phase applied voltages is $0.5V_{dc}$, in order to stop a maximum phase switching. At this time, the three-phase applied voltages wherein the modulation factor K is 85% are shown in FIG. 4A, the three-phase applied voltages wherein the modulation factor K is 100% are shown in FIG. 4B, and detected currents of two or more phases can be obtained in all regions.

Depending on the modulation factor K, there are cases wherein only one phase can be detected in one portion, but it is sufficient that the first shift amount Vofs1 is set to a value such that at least one phase of detected current is obtained.

When the modulation factor K is a third control value $K_3$ or less that satisfies the following Expression (4), the maximum phase applied voltage can be equal to or less than the maximum applied voltage, and detected currents of one or more phases are obtained in all regions. In FIG. 4A and FIG. 4B, a broken line a indicates the three-phase applied voltage $V_{u11c}$, a dashed-dotted line b indicates the three-phase applied voltage $V_{w11c}$, and a solid line c indicates the three-phase applied voltage $V_{w11c}$.

$$K_3 \leq \left(K_m + \frac{1}{2}\right) \quad (4)$$

Also, when the modulation factor K is greater than the third control value $K_3$, currents of one or more phases can be detected accurately when the maximum phase applied voltage is equal to or less than the maximum applied voltage $K_m V_{dc}$, or is the maximum value of the carrier signal C1. When the modulation factor is high, the intermediate phase applied voltage may be greater than the maximum applied voltage $K_m V_{dc}$ and less than the maximum value of the carrier signal C1, but currents of one or more phases can be detected accurately by providing two detection timings, and the remaining two phases can be estimated, as in, for example, Patent Literature 5.

Next, a computation of the second offset correction will be described. FIG. 5 is a flowchart illustrating a computation of the second offset correction.

In FIG. 5, the three-phase voltage commands $V_{u1}$, $V_{v1}$, and $V_{w1}$ are substituted, in order of decreasing magnitude, for the maximum phase $V_{max1}$, the intermediate phase $V_{mid1}$, and the minimum phase $V_{min1}$ in step S130.

In step S131, it is determined whether the modulation factor K is 90% or less, step S132 is executed in the case of "Yes", and step S133 is executed in the case of "No".

In step S132, corresponding to step S122, the second shift amount Vofs2 is fixed in such a way that the minimum phase $V_{min}c$ of the three-phase applied voltages is $-0.4V_{dc}$.

In step S133, it is determined whether the difference between an intermediate phase voltage command and a minimum phase voltage command is less than $0.1V_{dc}$, step S134 is executed in the case of "Yes", and step 3135 is executed in the case of "No".

In step S134, corresponding to step S124 of FIG. 3, the second shift amount Vofs2 is fixed in such a way that the maximum phase $V_{max}c$ of the three-phase applied voltages is $0.5V_{dc}$.

Figure 6A:
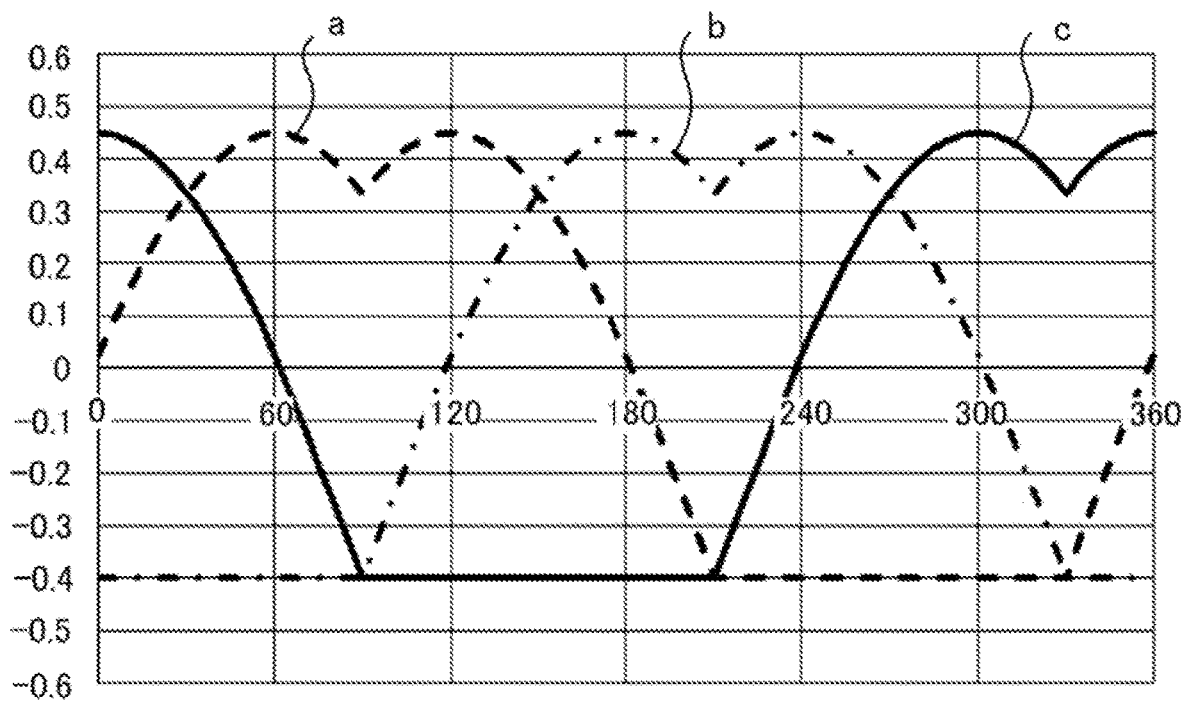
FIG. 6A is a drawing showing three-phase applied voltages wherein a modulation factor is 85% when fixing a second shift amount in the power conversion device according to the first embodiment.
Figure 6B:
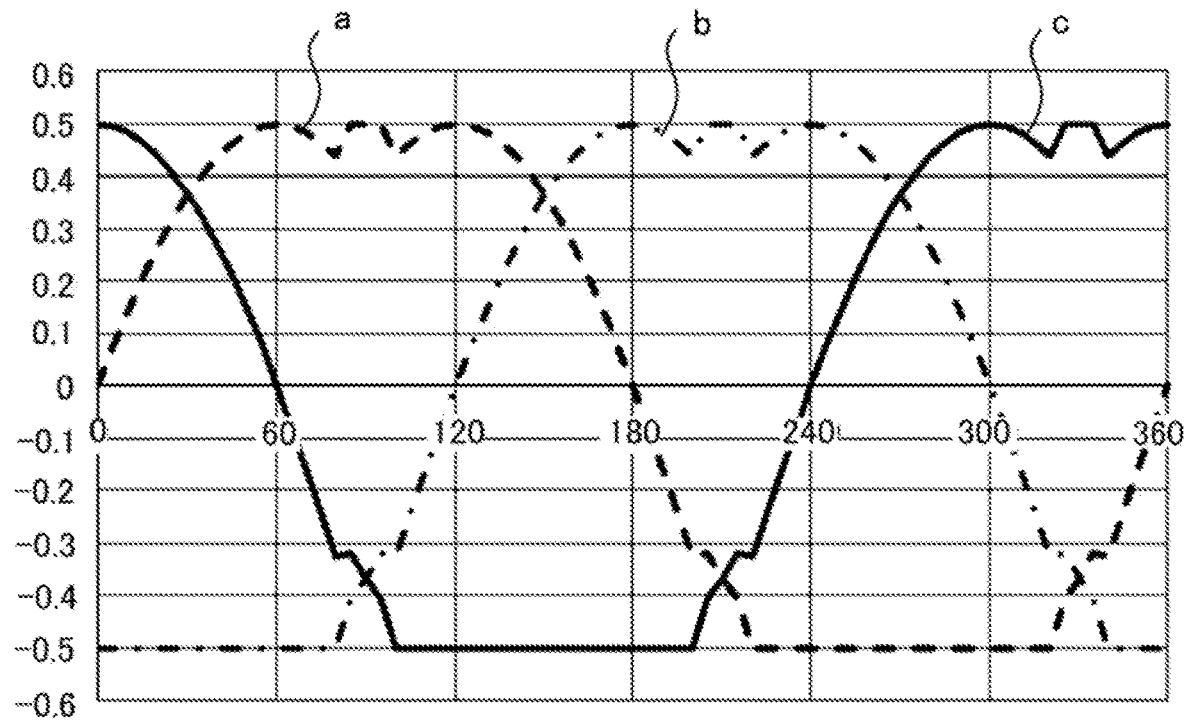
FIG. 6B is a drawing showing three-phase applied voltages wherein a modulation factor is 100% when fixing the second shift amount in the power conversion device according to the first embodiment.

In step S135, corresponding to step S125 of FIG. 3, the second shift amount Vofs2 is fixed in such a way that the minimum phase $V_{min}c$ of the three-phase applied voltages is $-0.5V_{dc}$. At this time, the three-phase applied voltages wherein the modulation factor K is 85% are shown in FIG. 6A, and the three-phase applied voltages wherein the modulation factor K is 100% are shown in FIG. 6B. In FIG. 6A and FIG. 6B, a broken line a indicates the three-phase applied voltage $V_{u12c}$, a dashed-dotted line b indicates the three-phase applied voltage $V_{v12c}$, and a solid line c indicates the three-phase applied voltage $V_{w12c}$.

Next, amounts of heat generated by the high potential side switching element Sup1 and the low potential side switching element Sun1 of the U1 phase will be described.

When an on-state time ratio of the high potential side switching element Sup1 with respect to a time of one cycle of the carrier signal C1 is $D_{u1}$ and a switching element on-state resistance is $R_{on}$, a generated heat amount $P_{up1}$ of the high potential side switching element Sup1 and a generated heat amount $P_{un1}$ of the low potential side switching element Sun1 are obtained from the following Expression (5).

$$\begin{cases} P_{up1} = I_{u1}^2 R_{on} D_{u1} \\ P_{un1} = I_{u1}^2 R_{on}(1 - D_{u1}) \end{cases} \quad (5)$$

Herein, the current $I_{u1}$ and the three-phase voltage command $V_{u1}$ are obtained from the following Expression (6). In Expression (6), $I_{uvw}$ indicates a phase current amplitude, $V_{uvw}$ indicates a phase voltage amplitude, and $\gamma$ indicates a phase difference between a phase voltage and a phase current, that is, a power factor angle.

$$\begin{cases} I_{u1} = I_{uvw}\sin\theta \\ V_{u1} = V_{uvw}\sin(\theta + \gamma) \end{cases} \quad (6)$$

When the three-phase applied voltage $V_{u1}c$ obtained using the offset computer 7 is expressed using the following Expression (7), the on-state time ratio $D_{u1}$ of the high potential side switching element Sup1 with respect to the time of one cycle of the carrier signal C1 is obtained from the following Expression (8), taking the offset fixed from the first shift amount Vofs1 and the second shift amount Vofs2 to be $f(\theta)$.

$$V_{u1}c = V_{u1} - f(\theta) \qquad (7)$$

$$D_{u1} = \frac{V_{u1}c}{V_{dc}} + 0.5 = \frac{V_{uvw}}{V_{dc}}\sin(\theta + \gamma) - f(\theta) + 0.5 \qquad (8)$$

When Expression (6) and Expression (8) are substituted into Expression (5), the generated heat amounts $P_{up1}$ and $P_{un1}$ are as in the following Expression (9).

$$\begin{cases} P_{up1} = \frac{1}{2}I_{uvw}^2 R_{on}(1-\cos 2\theta)\left\{\frac{V_{uvw}}{V_{dc}}\sin(\theta+\gamma) - f(\theta) + 0.5\right\} \\ P_{un1} = \frac{1}{2}I_{uvw}^2 R_{on}(1-\cos 2\theta)\left\{-\frac{V_{uvw}}{V_{dc}}\sin(\theta+\gamma) + f(\theta) + 0.5\right\} \end{cases} \qquad (9)$$

In order for the amount of heat generated by the high potential side switching element Sup1 and the amount of heat generated by the low potential side switching element Sun1 in one electrical angle cycle to be equal, it is sufficient that the following Expression (10) is established.

$$\int_0^{2\pi}(P_{up1} - P_{un1})d\theta = 0 \qquad (10)$$

That is, when the offset $f(\theta)$ fixed from the first shift amount Vofs1 and the second shift amount Vofs2 satisfies the following Expression (11), the amount of heat generated by the high potential side switching element Sup1 and the amount of heat generated by the low potential side switching element Sun1 can be equal.

$$\int_0^{2\pi}(1-\cos 2\theta)f(\theta)d\theta = 0 \qquad (11)$$

Figure 7A:
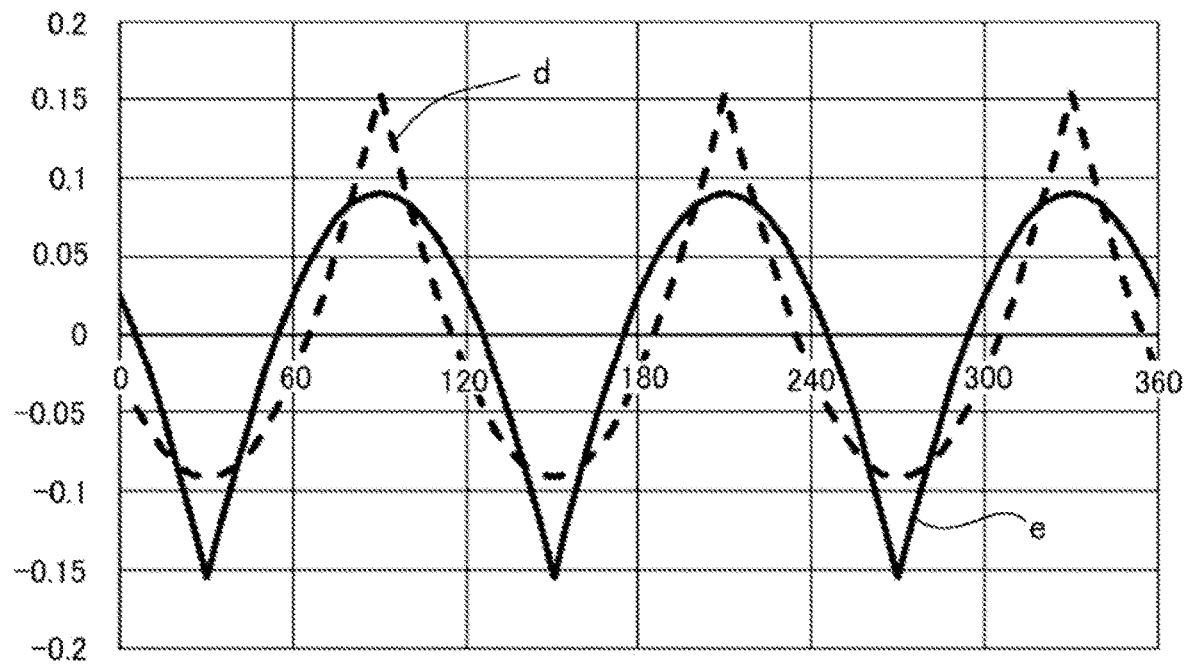
FIG. 7A is a drawing showing the first shift amount of FIG. 4A and FIG. 4B and the second shift amount of FIG. 6A and FIG. 6B.
Figure 7B:
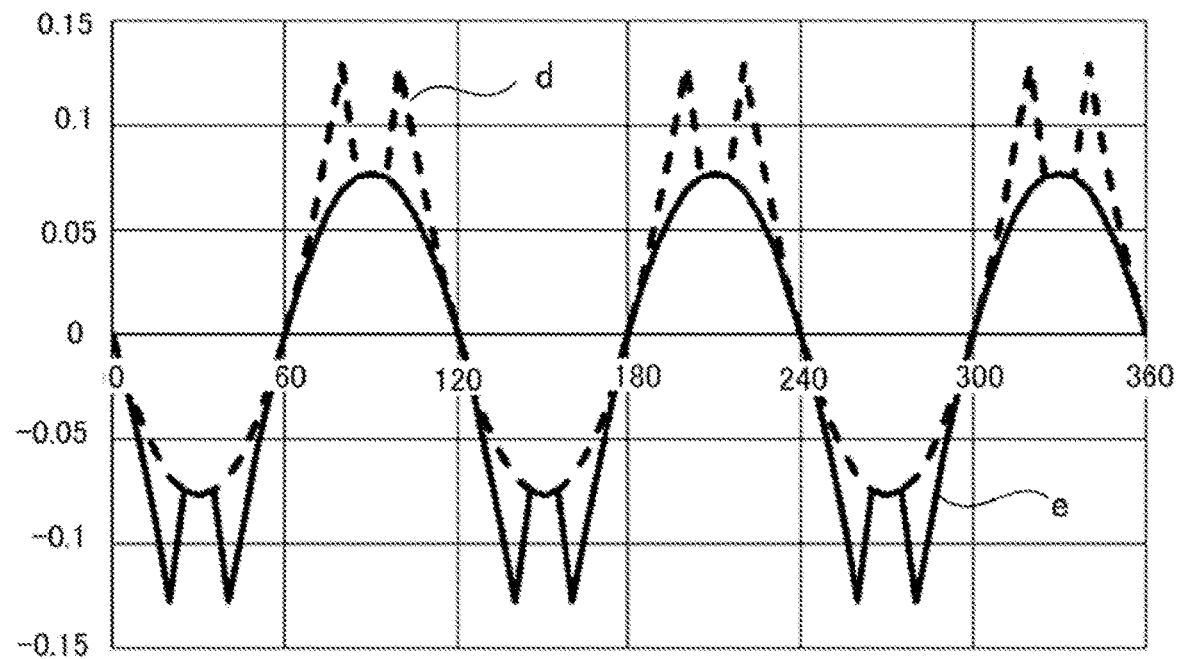
FIG. 7B is a drawing showing the first shift amount of FIG. 4A and FIG. 4B and the second shift amount of FIG. 6A and FIG. 6B.

FIG. 7A and FIG. 7B show the first shift amount Vofs1 of FIG. 4A and FIG. 4B and the second shift amount Vofs2 of FIG. 6A and FIG. 6B. A signal whose phase is shifted 180 degrees by inverting the sign of the first shift amount Vofs1 corresponds to the second shift amount Vofs2, satisfying Expression (11), and an equalization of the amount of heat generated by the high potential side switching element Sup1 and the amount of heat generated by the low potential side switching element Sun1 in one electrical angle cycle can be realized. In FIG. 7A and FIG. 7B, a broken line d indicates the second shift amount Vofs2 and a solid line e indicates the first shift amount Vofs1.

Figure 8:
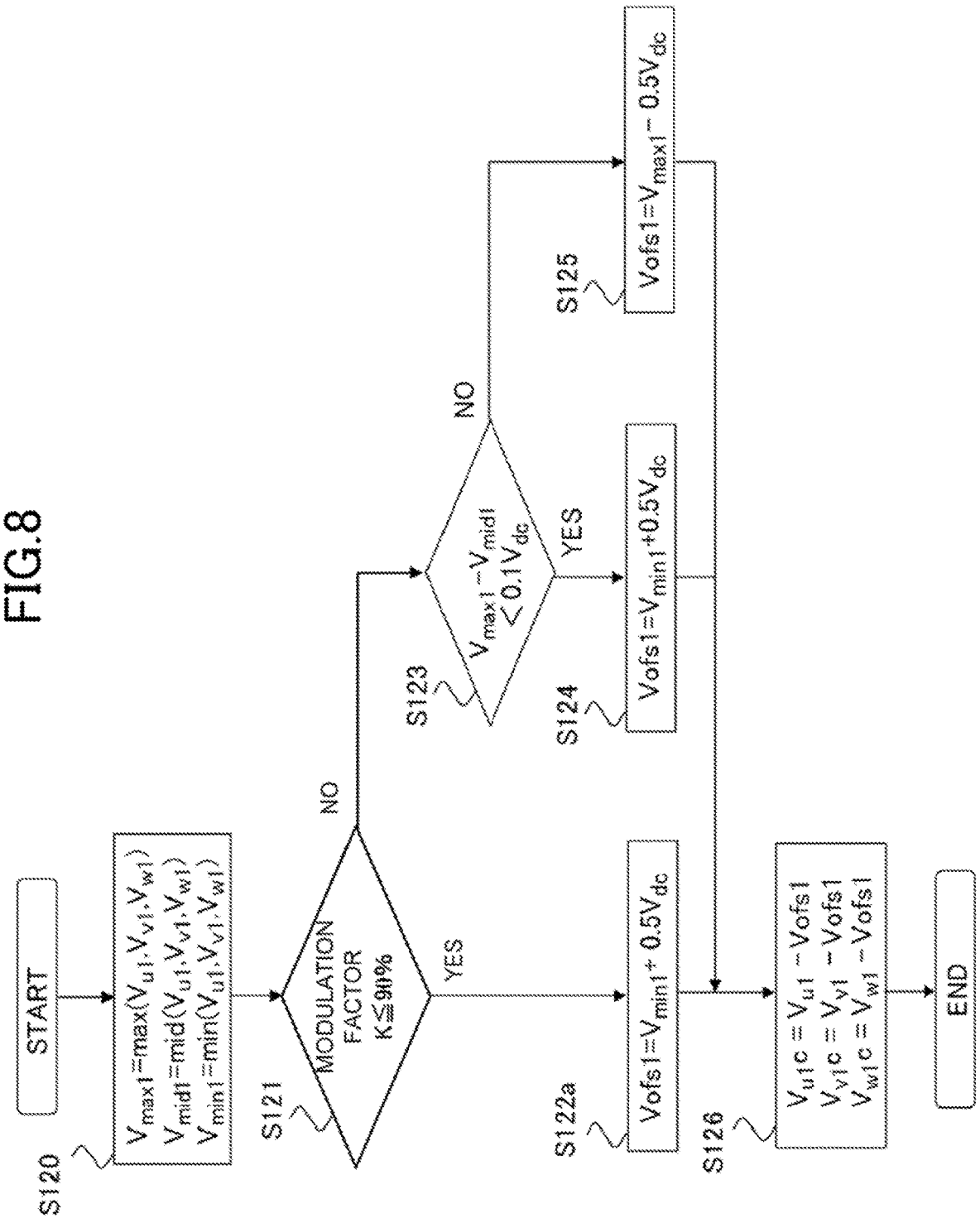
FIG. 8 is a flowchart illustrating another computation of the first offset correction in the power conversion device according to the first embodiment.

Also, a first offset correction computation flowchart may be as in FIG. 8, adopting step S122a instead of step S122 of FIG. 3.

In step S122a of FIG. 8, the applied voltage of the minimum phase $V_{min1}$ is a minimum value of the carrier signal C1, because of which a time from a switching of the maximum phase $V_{max1}$ to the detection timing $t_s$ is maximized, and current detection accuracy can be increased.

Figure 9A:
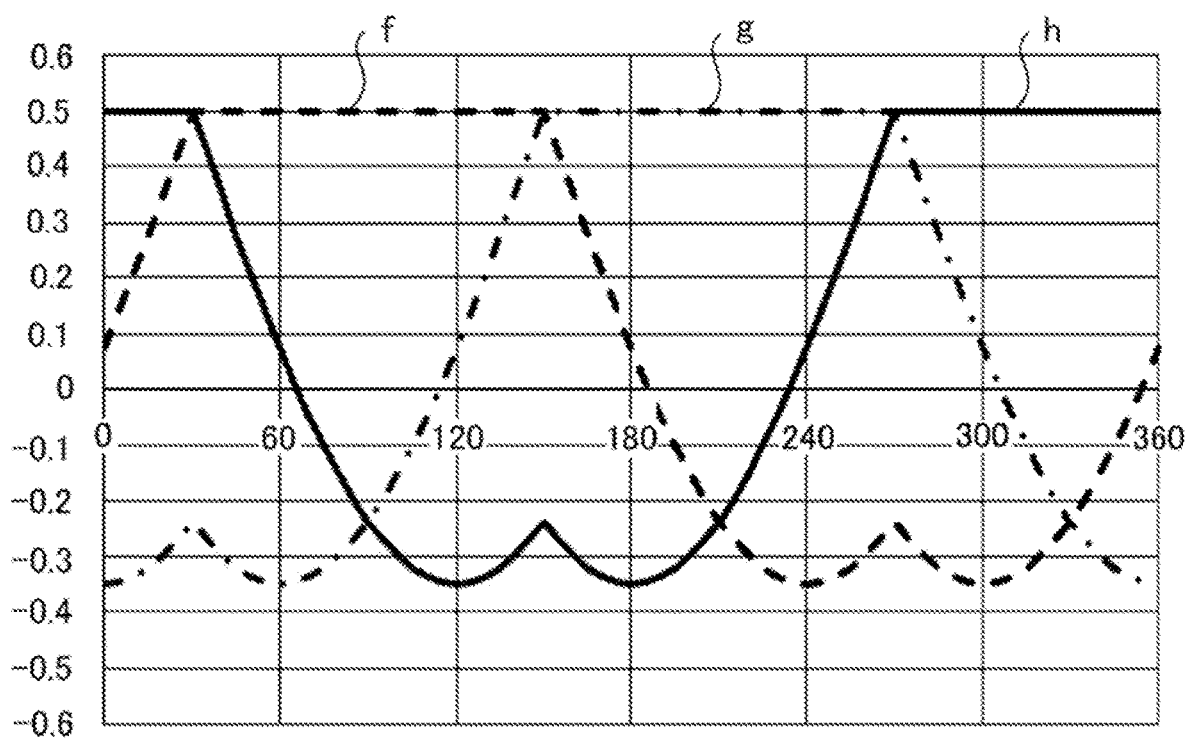
FIG. 9A is a drawing showing applied voltage waveforms when the second shift amount is provided in such a way that an applied voltage of a maximum phase of three-phase applied voltages is a maximum value of a carrier signal.
Figure 9B:
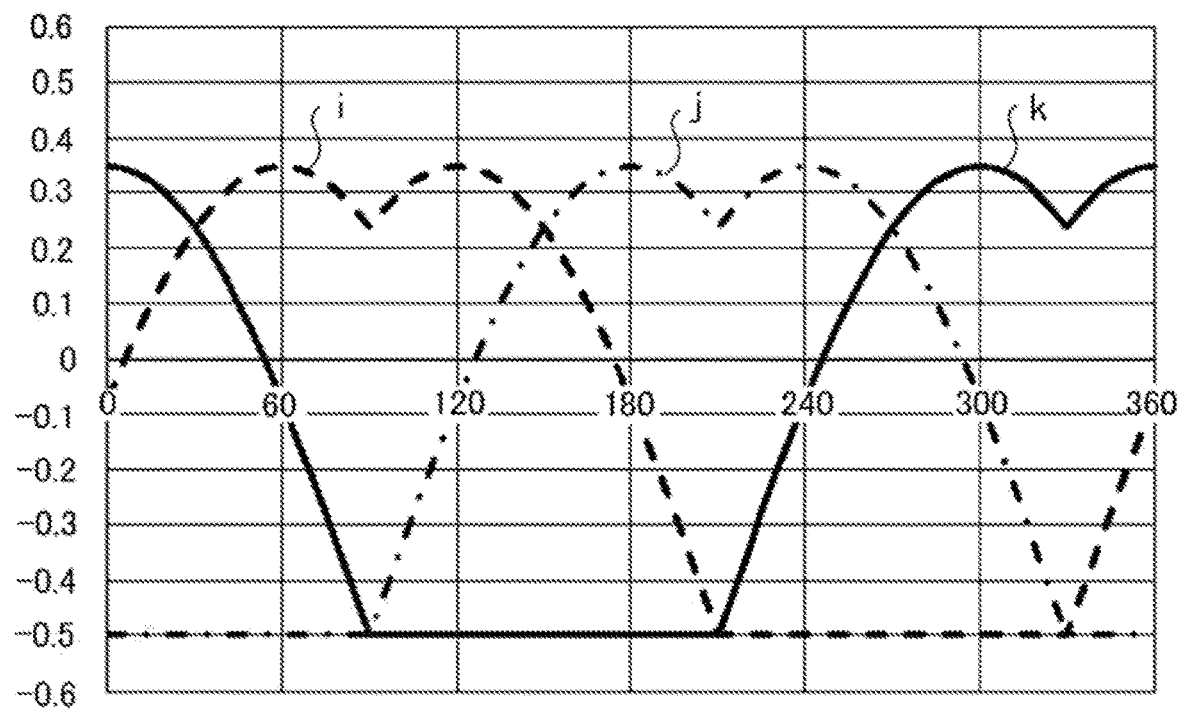
FIG. 9B is a drawing showing applied voltage waveforms when the second shift amount is provided in such a way that an applied voltage of a maximum phase of three-phase applied voltages is a maximum value of a carrier signal.

It is sufficient that a second shift amount is provided in such a way that the applied voltage of the maximum phase $V_{max1}$ of the three-phase applied voltages is a maximum value of the carrier signal C1. Applied voltage waveforms in a case wherein the maximum applied voltage ratio $K_m$ is 0.4 and the modulation factor K is 0.7 at this time are shown in FIG. 9A and FIG. 9B. In FIG. 9A, a broken line f indicates the three-phase applied voltage V a dashed-dotted line g indicates the three-phase applied voltage $V_{u12c}$, and a solid line h indicates the three-phase applied voltage V Also, in FIG. 9B, a broken line i indicates the three-phase applied voltage $V_{u11c}$, a dashed-dotted line j indicates the three-phase applied voltage $V_{v11c}$, and a solid line k indicates the three-phase applied voltage $V_{w11c}$.

Figure 10:
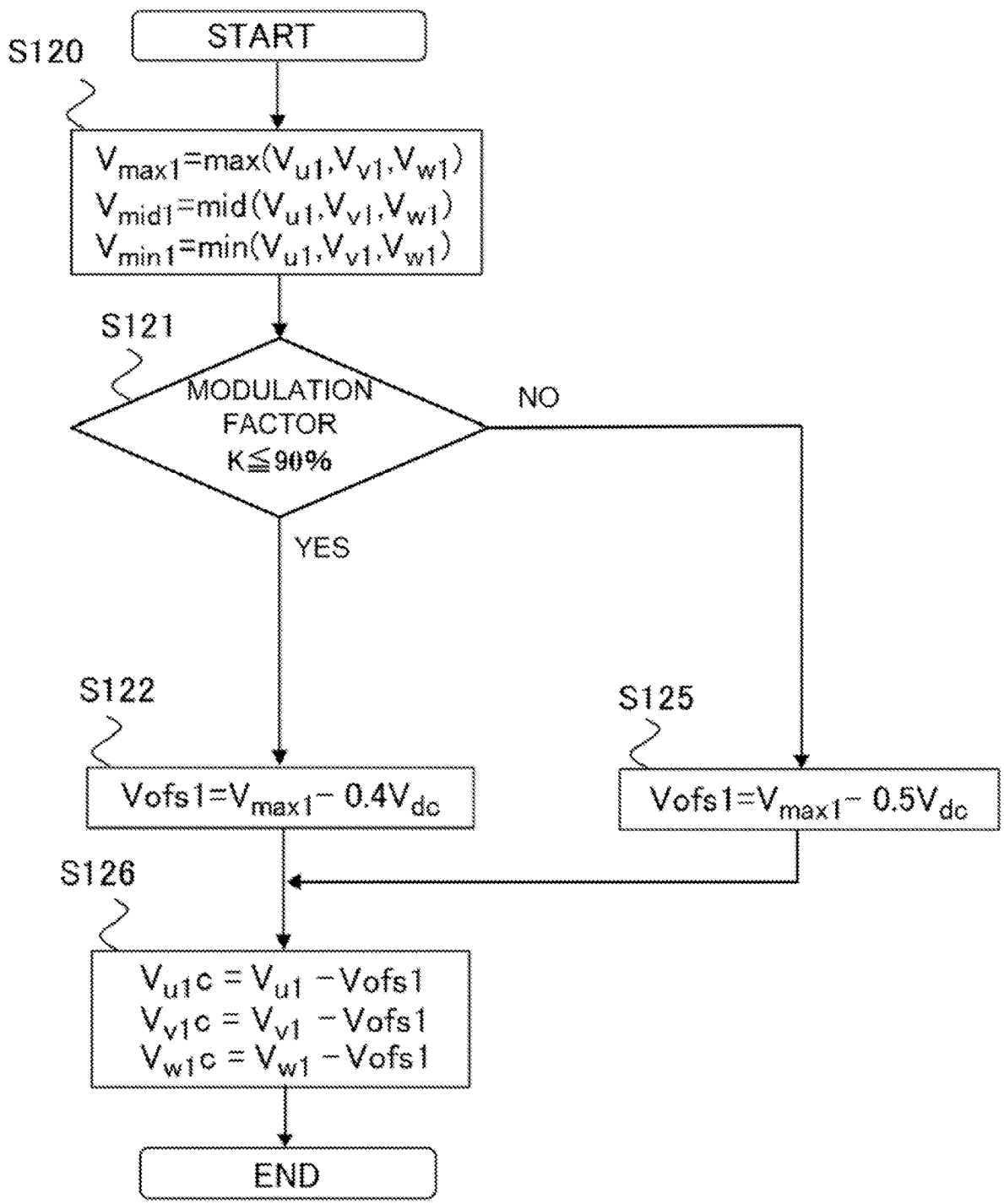
FIG. 10 is a flowchart illustrating still another computation of the first offset correction in the power conversion device according to the first embodiment.

Also, as an electrical angle changing in a carrier wave cycle is large when the modulation factor K is high, a time spent in a region in which the difference between maximum phase and intermediate phase voltage commands is small is short, because of which a first offset correction computation flowchart may be as in FIG. 10, omitting step S123 of FIG. 3.

When the modulation factor K is greater than the third control value $K_3$ provided at the maximum applied voltage ratio $K_m + 0.5$, one phase's worth of switching can be stopped by the maximum value of the carrier signal C1 being adopted, because of which currents of one or more phases can be detected accurately, while restricting current detection errors caused by switching noise in other phases. Also, a reduction of a processing load can be achieved by reducing conditional branching.

Figure 11A:
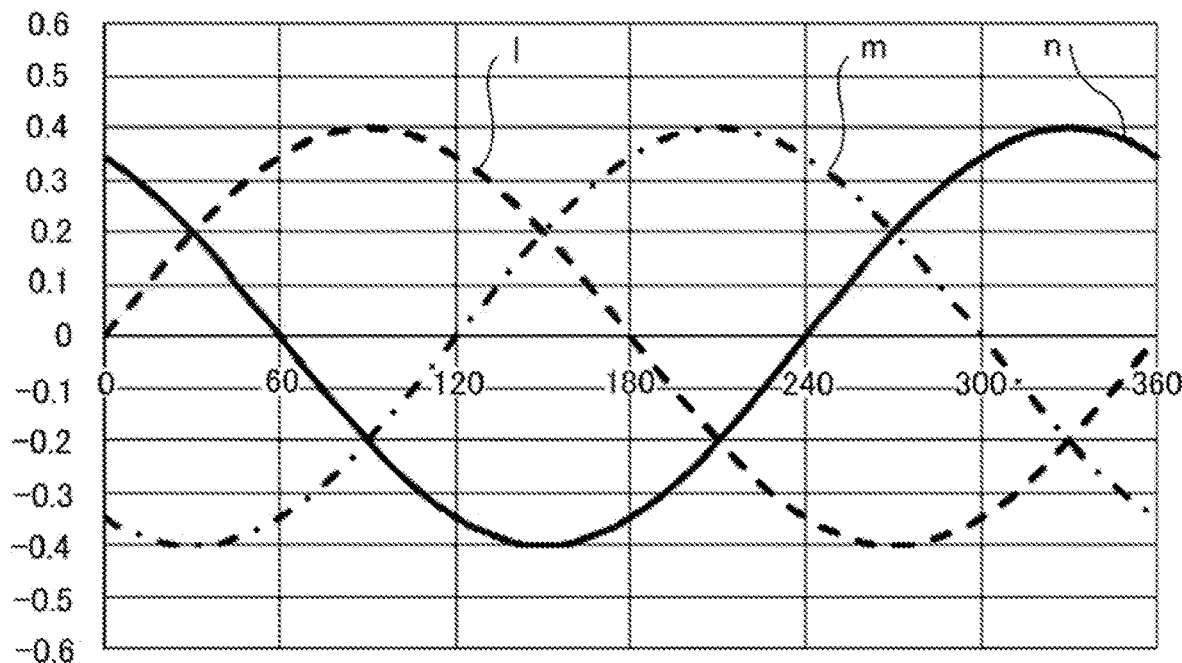
FIG. 11A is a drawing of applied voltage waveforms in a case wherein a maximum value of an applied voltage is such that current can be detected is 0.4, and a modulation factor is $2\sqrt{3}/5$, in the power conversion device according to the first embodiment.
Figure 11B:
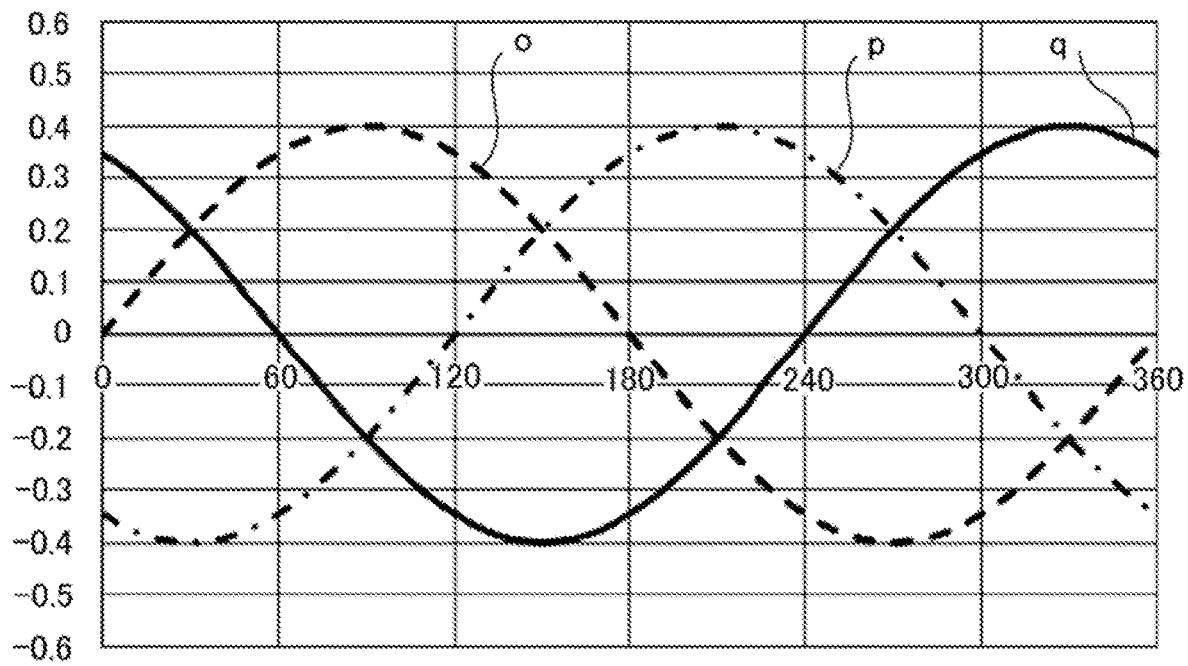
FIG. 11B is a drawing of applied voltage waveforms in a case wherein a maximum value of an applied voltage is such that current can be detected is 0.4, and a modulation factor is $2\sqrt{3}/5$, in the power conversion device according to the first embodiment.

Also, when the modulation factor K is low, voltage command amplitude is small, and there is freedom of choice in a first shift amount. Therefore, the first shift amount may be zero when the modulation factor K is equal to or less than a first control value $K_1$. In order to carry out current detection accurately, it is necessary that the maximum phase applied voltage is equal to or less than the maximum applied voltage $K_m V_{dc}$, because of which it is sufficient that the first control value $K_1$ satisfies the following Expression (12). When a second shift amount is also zero, an equalization of generated heat amounts can be achieved. Applied voltage waveforms in a case wherein the maximum applied voltage ratio $K_m$ is 0.4 and the modulation factor K is $2\sqrt{3}/5$ at this time are shown in FIG. 11A and FIG. 11B. The three-phase applied voltages $V_{u11}c$, $V_{v11}c$, and $V_{w11}c$ obtained by the first offset correction and the three-phase applied voltages $V_{u12}c$, $V_{v12}c$, and $V_{w12}c$ obtained by the second offset correction are equal. In FIG. 11A, a broken line l indicates the three-phase applied voltage $V_{u12c}$, a dashed-dotted line m indicates the three-phase applied voltage $V_{v12c}$, and a solid line n indicates the three-phase applied voltage $V_{w12c}$. Also, in FIG. 11B, a broken line o indicates the three-phase applied voltage $V_{u11c}$, a dashed-dotted line p indicates the three-phase applied voltage $V_{v11c}$, and a solid line q indicates the three-phase applied voltage $V_{w11c}$.

$$K_1 \leq \sqrt{3}K_m \qquad (12)$$

Also, when wishing to fix a shift amount such that the modulation factor K is less than or equal to a second control value $K_2$, the first shift amount is calculated based on the second control value $K_2$, as in the following Expression (13). That is, the first shift amount is fixed regardless of the modulation factor K at the time.

$$\left(\frac{1}{2} - \frac{K_2}{\sqrt{3}}\right)V_{dc} \qquad (13)$$

As it is sufficient that the second shift amount is fixed in such a way that a sum of the second shift amount and the first shift amount is zero, the following Expression (14) is adopted.

$$\left(\frac{K_2}{\sqrt{3}} - \frac{1}{2}\right)V_{dc} \qquad (14)$$

In order to carry out current detection accurately, it is necessary that the maximum phase applied voltage is equal to or less than the maximum applied voltage $K_m V_{dc}$, because of which it is sufficient that the second control value $K_2$ satisfies the following Expression (15).

$$K_2 \leq \frac{\sqrt{3}}{2}\left(K_m + \frac{1}{2}\right) \quad (15)$$

Figure 12A:
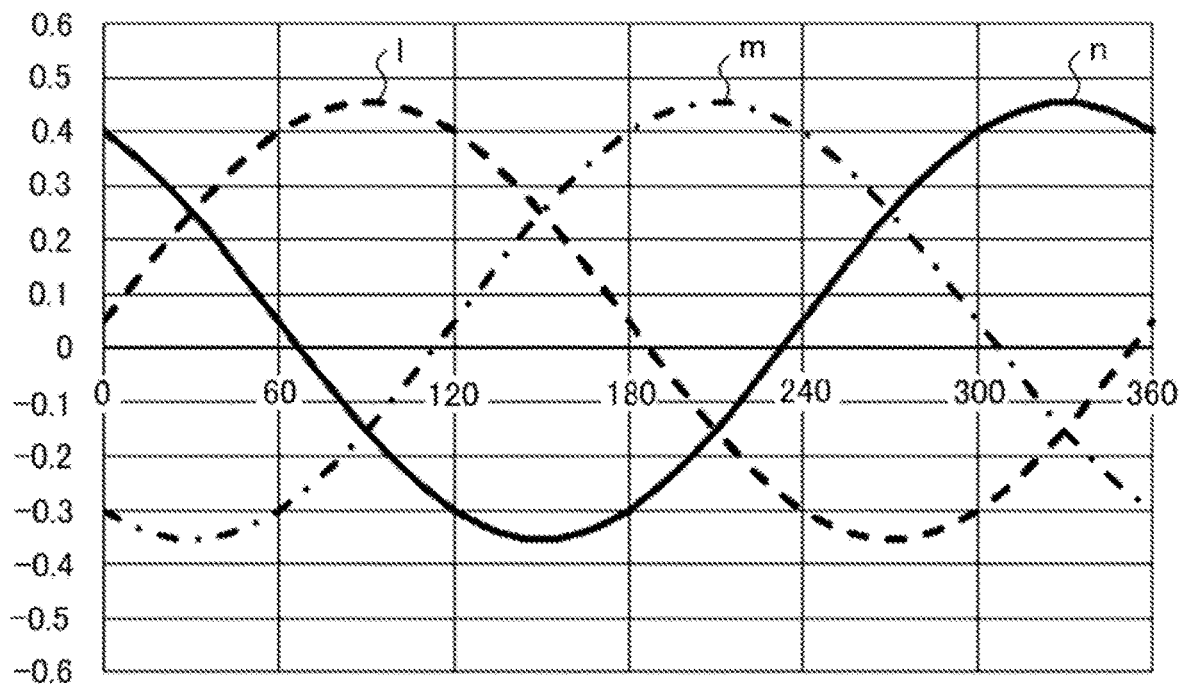
FIG. 12A is a drawing of applied voltage waveforms in a case wherein a maximum value of an applied voltage is such that current can be detected is 0.4, and a modulation factor is 0.7, in the power conversion device according to the first embodiment.
Figure 12B:
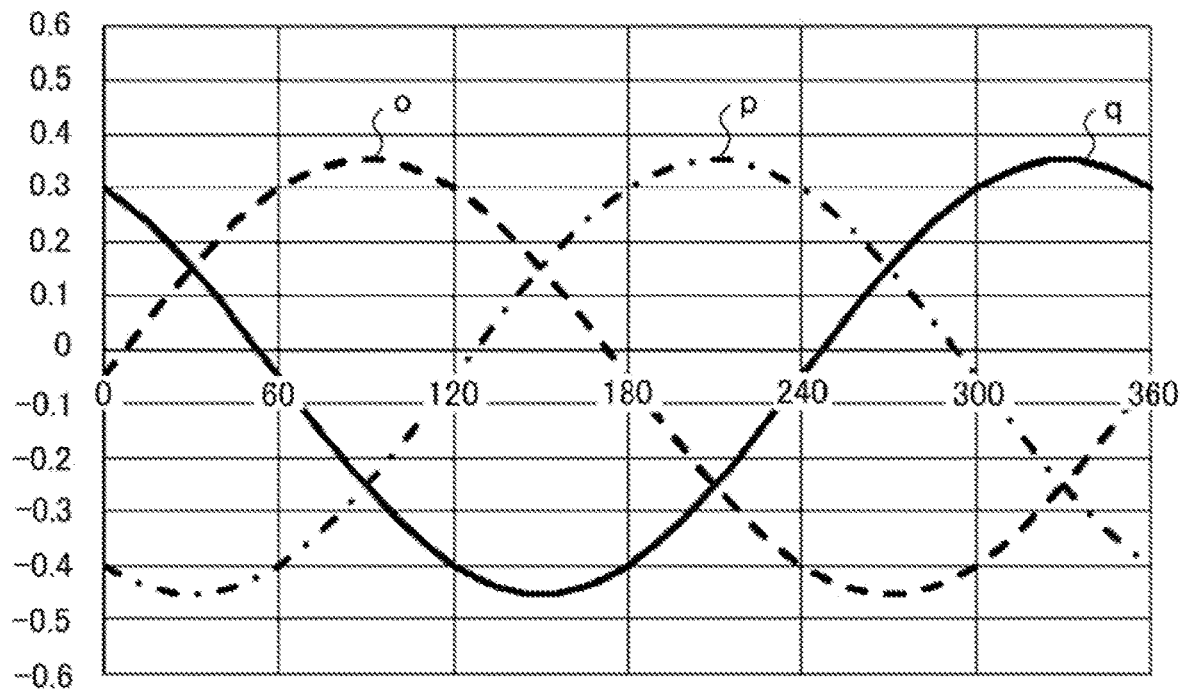
FIG. 12B is a drawing of applied voltage waveforms in a case wherein a maximum value of an applied voltage is such that current can be detected is 0.4, and a modulation factor is 0.7, in the power conversion device according to the first embodiment.

Applied voltage waveforms in a case wherein the maximum applied voltage ratio $K_m$ is 0.4 and the modulation factor K is 0.7 at this time are shown in FIG. 12A and FIG. 12B. When the shift amount is constant, as in Expression (14), a low-order fluctuation of a neutral point voltage can be restricted. In particular, the present configuration, which restricts neutral point voltage fluctuation, is excellent for determination accuracy in a configuration such that a failure or an abnormality is detected using an average value of acquired neutral point voltages or three-phase voltages. In FIG. 12A, a broken line 1 indicates the three-phase applied voltage $V_{u12c}$, a dashed-dotted line m indicates the three-phase applied voltage $V_{v12c}$, and a solid line n indicates the three-phase applied voltage $V_{w12c}$. Also, in FIG. 12B, a broken line o indicates the three-phase applied voltage $V_{u11c}$, a dashed-dotted line p indicates the three-phase applied voltage $V_{v11c}$, and a solid line q indicates the three-phase applied voltage $V_{w11c}$.

When a thermal resistance of the high potential side switching elements Sup1, Svp1, and Swp1 and a thermal resistance of the low potential side switching elements Sun1, Svn1, and Swn1 differ, when an on-state resistance of the high potential side switching elements Sup1, Svp1, and Swp1 and an on-state resistance of the low potential side switching elements Sun1, Svn1, and Swn1 differ, or the like, it is sufficient that the second shift amount is such that the following Expression (16) is established using a constant $K_{pn}$ based on the difference.

$$\int_0^{2\pi}(P_{up1} - K_{pn} P_{un1}) d\theta = 0 \quad (16)$$

FIG. 13 is a drawing showing operation timings of the voltage command computer 6, the offset computer 7, and the on/off signal generator 8. Herein, Qup1($m$−1), Qun1($m$−1), Qvp1($m$−1), Qvn1($m$−1), Qwp1($m$−1), and Qwn1($m$−1) are on/off signals based on three-phase applied voltages $V_{u1}$(m−1)c, $V_{v1}$(m−1)c, and $V_{w1}$(m−1)c obtained by a first offset correction.

As an applied voltage resulting from a first offset correction such that current can be detected is output at a timing t(m), three-phase voltage commands $V_{u1}$(m), $V_{v1}$(m), and $V_{w1}$(m) are calculated by detecting $m^{th}$ $I_{u1}$(m), $I_{v1}$(m), and $I_{w1}$(m), and three-phase applied voltages $V_{u1}$(m) c, $V_{v1}$(m)c, and $V_{w1}$(m)c are calculated in accordance with a second offset correction based on the three-phase voltage commands $V_{u1}$(m), $V_{v1}$(m), and $V_{w1}$(m).

As an applied voltage resulting from a second offset correction for generated heat amount equalization is output at a timing t(m+1), three-phase applied voltages $V_{u1}$(m+1)c, $V_{v1}$(m+I) c, and $V_{w1}$(m+1)c are calculated in accordance with the first offset correction based on the previous three-phase voltage commands $V_{u1}$(m), $V_{v1}$(m), and $V_{w1}$(m), with no current detection being carried out. Voltages whose phases are advanced with respect to the previous three-phase voltage commands $V_{u1}$(m), $V_{v1}$(m), and $V_{w1}$(m) by an amount equivalent to a rotational change of the alternating current rotating machine 1 may be used.

As an applied voltage resulting from a first offset correction such that current can be detected is output at a timing t(m+2), three-phase voltage commands $V_{u1}$(m+2), $V_{v1}$(m+2), and $V_{w1}$(m+2) are calculated by detecting (m+2)$^{th}$ $I_{u1}$(m+2), $I_{v1}$(m+2), and $I_{w1}$(m+2), and three-phase applied voltages $V_{u1}$(m+2)c, $V_{v1}$(m+2)c, and $V_{w1}$(m+2)c are calculated in accordance with a second offset correction based on the three-phase voltage commands $V_{u1}$(m+2), $V_{v1}$(m+2), and $V_{w1}$(m+2).

That is, when an applied voltage generated in accordance with a first offset correction such that current can be detected is output, a voltage command is computed based on each detected phase current, and when an applied voltage generated in accordance with a second offset correction for generated heat amount equalization, which does not give consideration to whether or not current can be detected, is output, generated heat amount equalization is achieved, while obtaining accurately detected current, by not updating voltage commands, and a processing load can be restricted by stopping calculation based on inaccurate current detection.

By switching between a first offset correction and a second offset correction in a carrier wave cycle, time wasted from a current detection to an applied voltage reflection can be restricted to a minimum, because of which an improvement in current detection accuracy and a generated heat amount equalization can be realized, without causing a control response to worsen.

Second Embodiment

Next, a power conversion device according to a second embodiment will be described.

Figure 14:
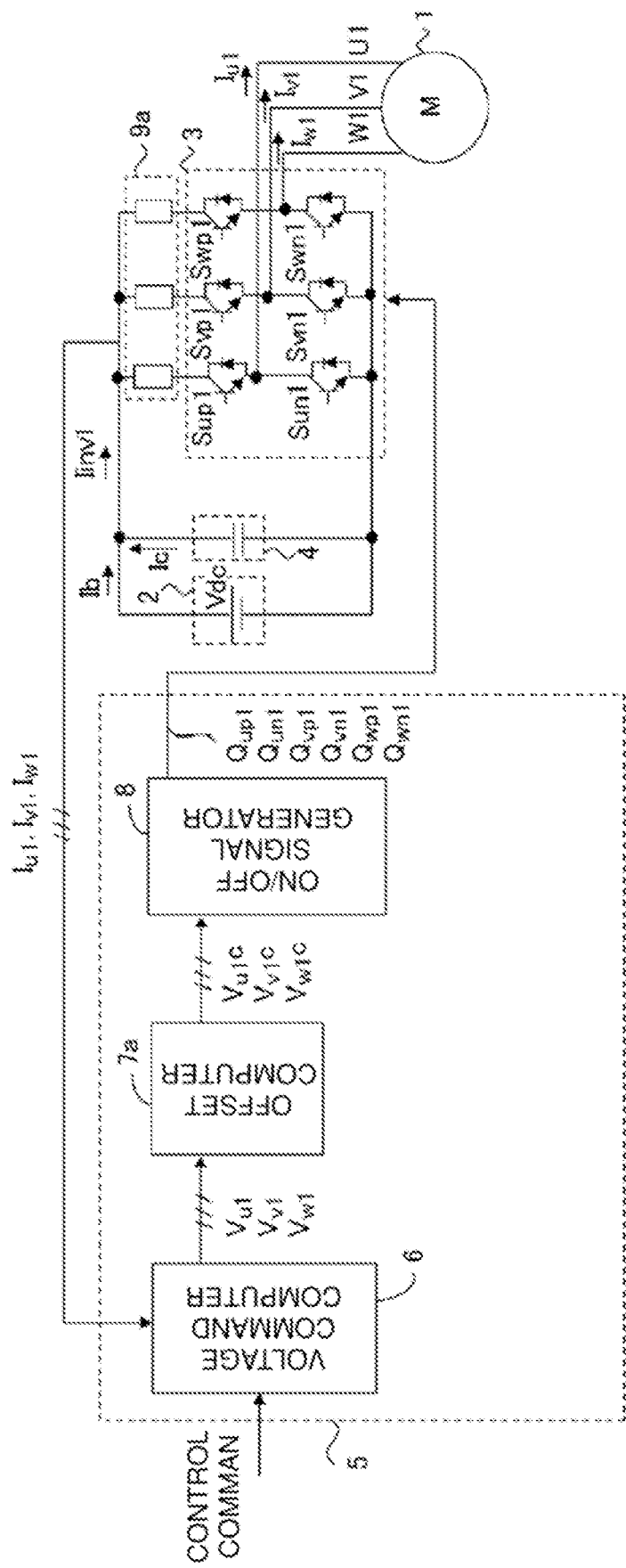
FIG. 14 is an overall configuration drawing wherein an alternating current rotating machine is controlled by a power conversion device according to a second embodiment.

FIG. 14 is an overall configuration drawing wherein an alternating current rotating machine is controlled by a power conversion device according to the second embodiment. The power conversion device according to the second embodiment is such that a current detector 9a differs from that of the power conversion device of the first embodiment.

The current detector 9a is provided in series with each phase of the high potential side switching elements Sup1, Svp1, and Swp1 of the power converter 3, and detects the currents $I_{u1}$, $I_{v1}$, and $I_{w1}$ flowing through the three-phase windings.

Figure 15:
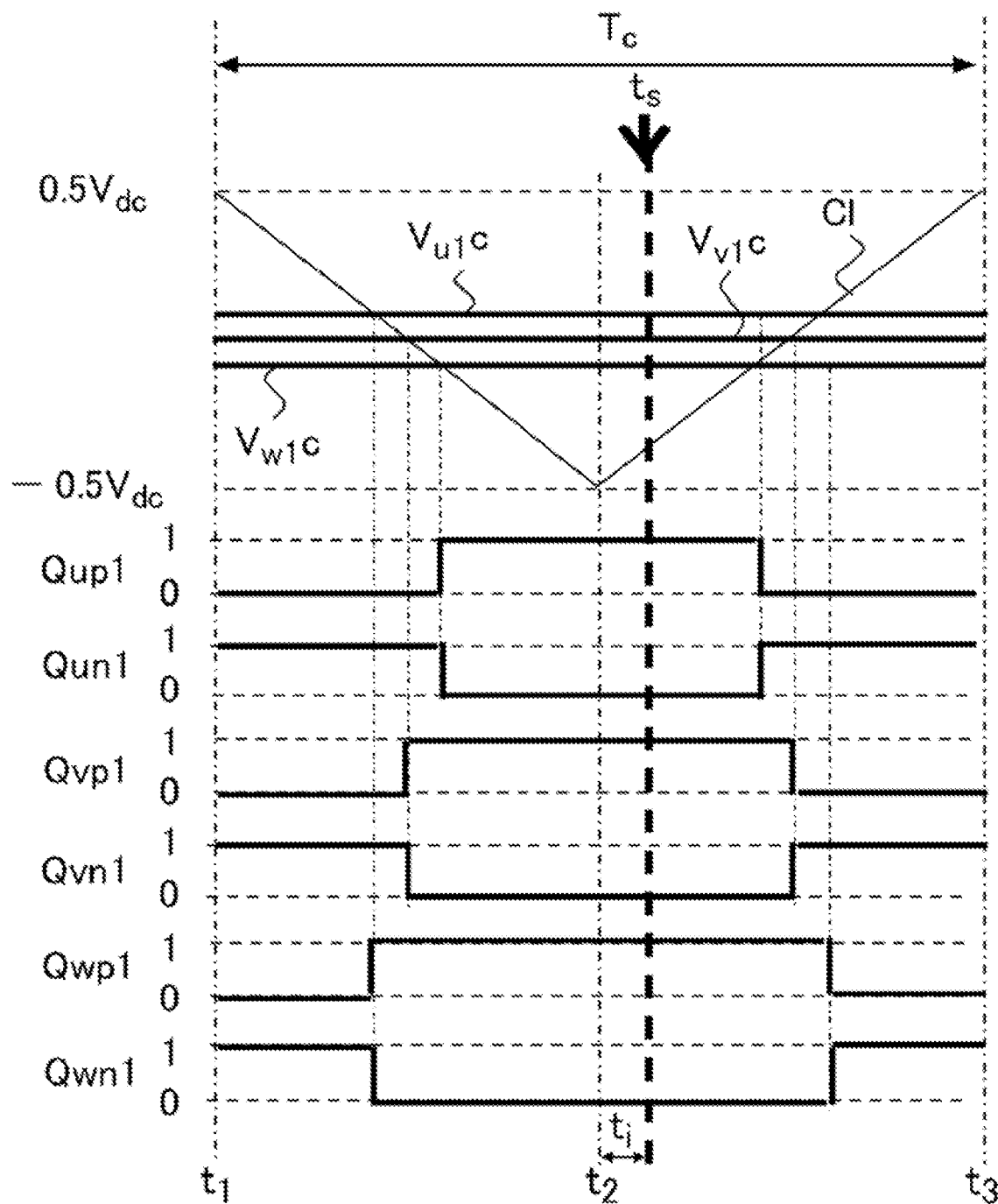
FIG. 15 is an illustration of an operation of an on/off signal generator used in the power conversion device according to the second embodiment.

FIG. 15 is an illustration of an operation of an on/off signal generator used in the power conversion device according to the second embodiment, and is a drawing that corresponds to FIG. 2 of the first embodiment.

In FIG. 15, in order for the current detector 9a to detect accurately at the detection timing $t_n$, it is necessary not to cause a switching from 0 to 1 or from 1 to 0 of the on/off signals Qup1, Qun1, Qvp1, Qvn1, Qwp1, and Qwn1 applied to the power converter 3 to occur in a period from $t_n - t_i$ to $t_s$. When this switching is caused to occur, noise becomes mixed in with the detected currents $I_{u1}$, $I_{v1}$, and $I_{w1}$, resultantly causing vibration or noise to occur from the alternating current rotating machine 1.

The current detector 9a inserted in series with the high potential side switching elements Sup1, Svp1, and Swp1 is such that when a ratio with respect to the direct current voltage of the minimum value of an applied voltage such that current can be detected (hereafter referred to as a minimum applied voltage ratio) is $K_n$, current can be detected accurately when the applied voltage is $K_s V_{dc}$ (hereafter referred to as a minimum applied voltage) or greater. Herein, $K_s$ satisfies the following Expression (17).

$$K_s < -0.5 + \frac{t_i}{T_c} \quad (17)$$

For example, when the cycle $T_c$ is 50 μs and the time $t_i$ needed for the current detector 9a to detect current is 4.9 ρs, three phases of current can be detected when the modulation factor K such that the minimum phase $V_{min1}c$ can be modulated to $-0.4V_{dc}$ or greater is 90% or less. As the minimum phase $V_{min1}c$ is less than $-0.4V_{dc}$ in a region in which the modulation factor K exceeds 90%, the two phases other than the minimum phase can be detected, and the remaining phase can be obtained by estimation from the two detectable phases using a publicly known method. Also, by updating an on/off signal at a peak of the carrier signal C1, as shown in FIG. 15, an on/off signal that is approximately symmetrical centered on a trough of the carrier signal C1 can be realized, and it can be determined by applying voltage once whether or not current can be detected, which is preferred. When updating an on/off signal in a trough of the carrier signal C1, it is sufficient to determine whether or not current can be detected by considering two voltage applications, one either side of a trough of the carrier signal C1.

Hereafter, a description will be given with a case wherein the minimum applied voltage ratio $K_s$ is $-0.4$ as an example.

FIG. 16 is a flowchart illustrating a computation of a first offset correction in the power conversion device according to the second embodiment. In FIG. 16, step S122b to step S125b differ from those in FIG. 3 of the first embodiment.

In step S122b, a first shift amount is fixed in such a way that the minimum phase $V_{min}c$ of the three-phase applied voltages is equal to or greater than $-0.4V_{dc}$, wherein current can be detected.

In step S123b, it is determined whether the difference between an intermediate phase voltage command and a minimum phase voltage command is less than $0.1V_{dc}$, step S124b is executed in the case of "Yes", and step S125b is executed in the case of "No".

In step S124b, the first shift amount is fixed in such a way that the maximum phase $V_{max}c$ of the three-phase applied voltages is $0.5V_{dc}$, in order to maximize a time from a minimum phase switching to the detection timing $t_s$.

Figure 17A:
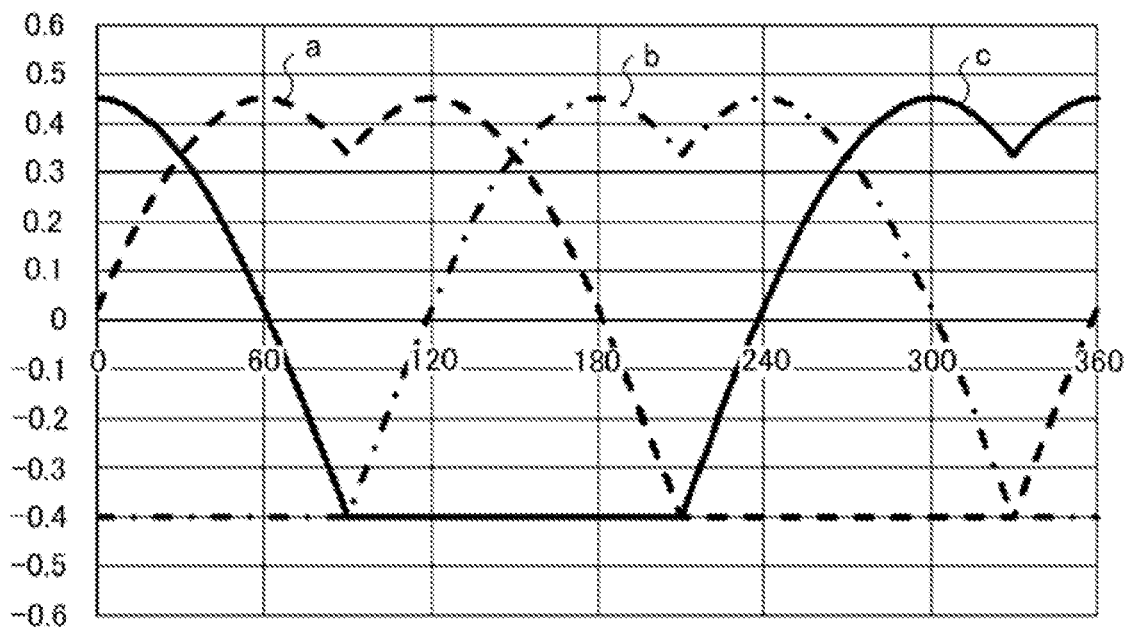
FIG. 17A is a drawing showing three-phase applied voltages wherein a modulation factor is 85% when fixing a first shift amount in the power conversion device according to the second embodiment.
Figure 17B:
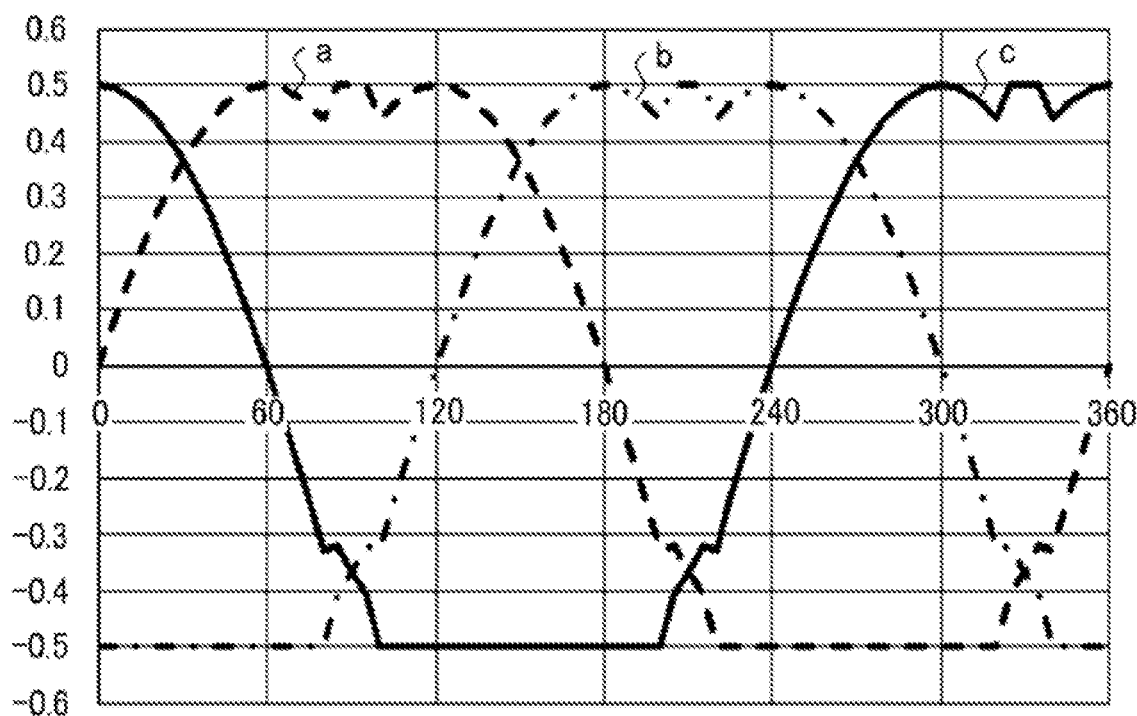
FIG. 17B is a drawing showing three-phase applied voltages wherein a modulation factor is 100% when fixing the first shift amount in the power conversion device according to the second embodiment.

In step S125b, the first shift amount is fixed in such a way that the minimum phase $V_{min}c$ of the three-phase applied voltages is $-0.5V_{dc}$, in order to stop a minimum phase switching. At this time, the three-phase applied voltages wherein the modulation factor K is 85% are shown in FIG. 17A, the three-phase applied voltages wherein the modulation factor K is 100% are shown in FIG. 17B, and detected currents of two or more phases can be obtained in all regions. Depending on the modulation factor K, there are cases wherein only one phase can be detected in one portion, but it is sufficient that the first shift amount is set to a value such that at least one phase of detected current is obtained.

That is, when the modulation factor K is equal to or less than the third control value $K_3$ that satisfies the following Expression (18), the minimum phase applied voltage can be equal to or greater than the minimum applied voltage, and detected currents of one or more phases are obtained in all regions. In FIG. 17A and FIG. 17B, a broken line a indicates the three-phase applied voltage $V_{u11c}$, a dashed-dotted line b indicates the three-phase applied voltage $V_{v11c}$, and a solid line c indicates the three-phase applied voltage $V_{w11c}$.

$$K_3 \leq \left(\frac{1}{2} - K_s\right) \quad (18)$$

Also, when the modulation factor K is greater than the third control value $K_3$, currents of one or more phases can be detected accurately when the minimum phase applied voltage is equal to or greater than the minimum applied voltage $K_sV_{dc}$, or is the minimum value of the carrier signal C1.

Figure 18:
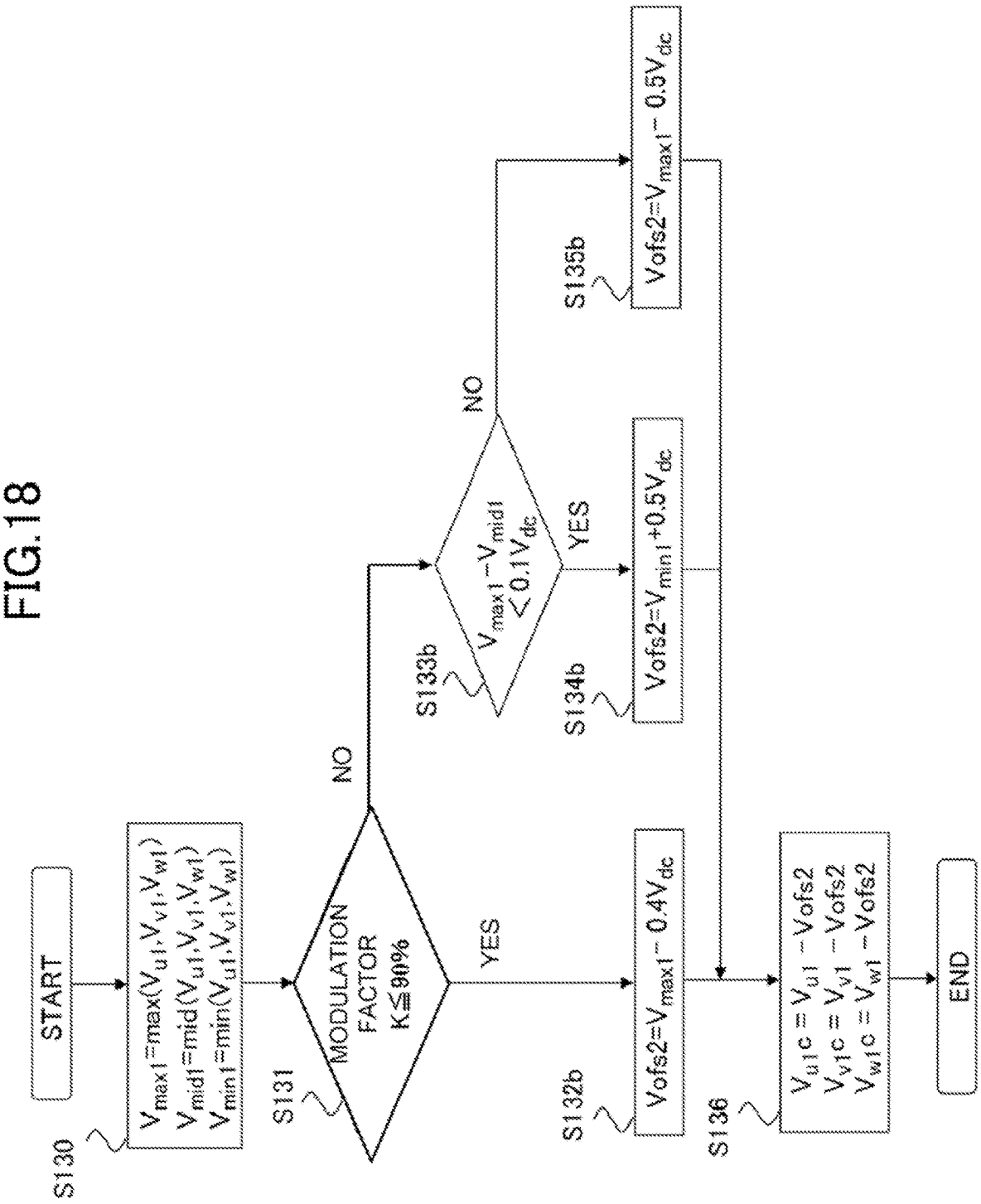
FIG. 18 is a flowchart illustrating a computation of a second offset correction in the power conversion device according to the second embodiment.

FIG. 18 is a flowchart illustrating a computation of a second offset correction. In FIG. 18, step S132b to step S135b differ from those in FIG. 5 of the first embodiment.

In step S132b, corresponding to step S122b of FIG. 16, a second shift amount is fixed in such a way that the maximum phase $V_{max}c$ of the three-phase applied voltages is $0.4V_{dc}$.

In step S133b, it is determined whether the difference between a maximum phase voltage command and an intermediate phase voltage command is less than $0.1V_{dc}$, step S134b is executed in the case of "Yes", and step S135b is executed in the case of "No".

In step S134b, corresponding to step S124b of FIG. 16, the second shift amount is fixed in such a way that the minimum phase $V_{min}c$ of the three-phase applied voltages is $-0.5V_{dc}$.

Figure 19A:
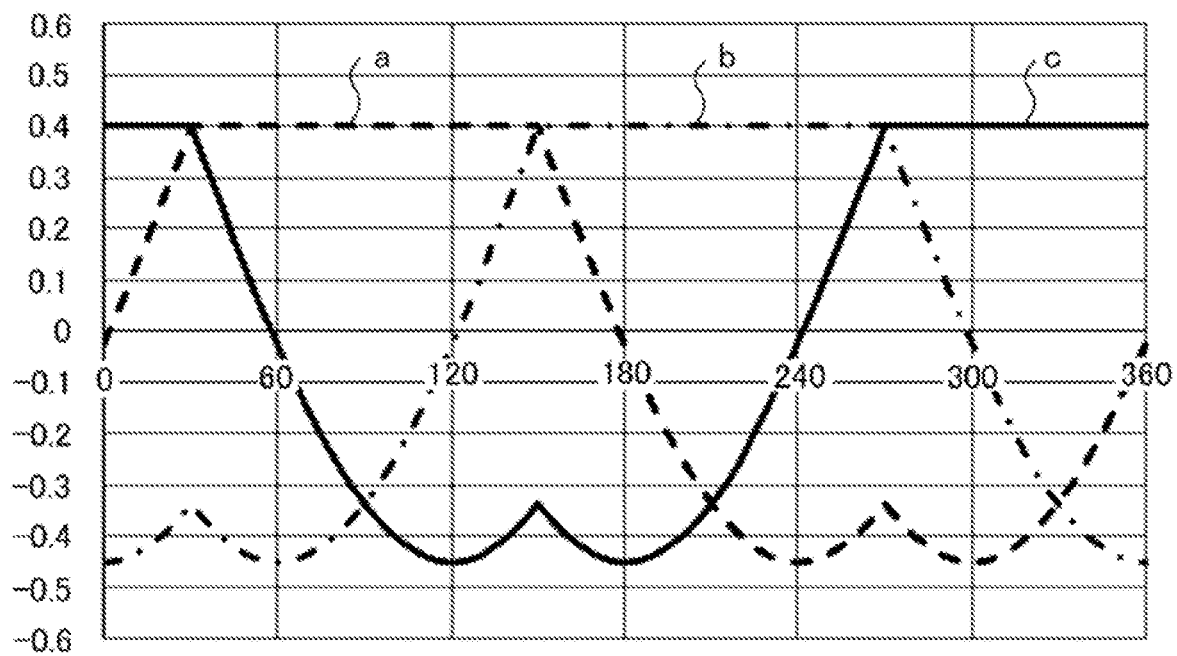
FIG. 19A is a drawing showing three-phase applied voltages wherein a modulation factor is 85% when fixing a second shift amount in the power conversion device according to the second embodiment.
Figure 19B:
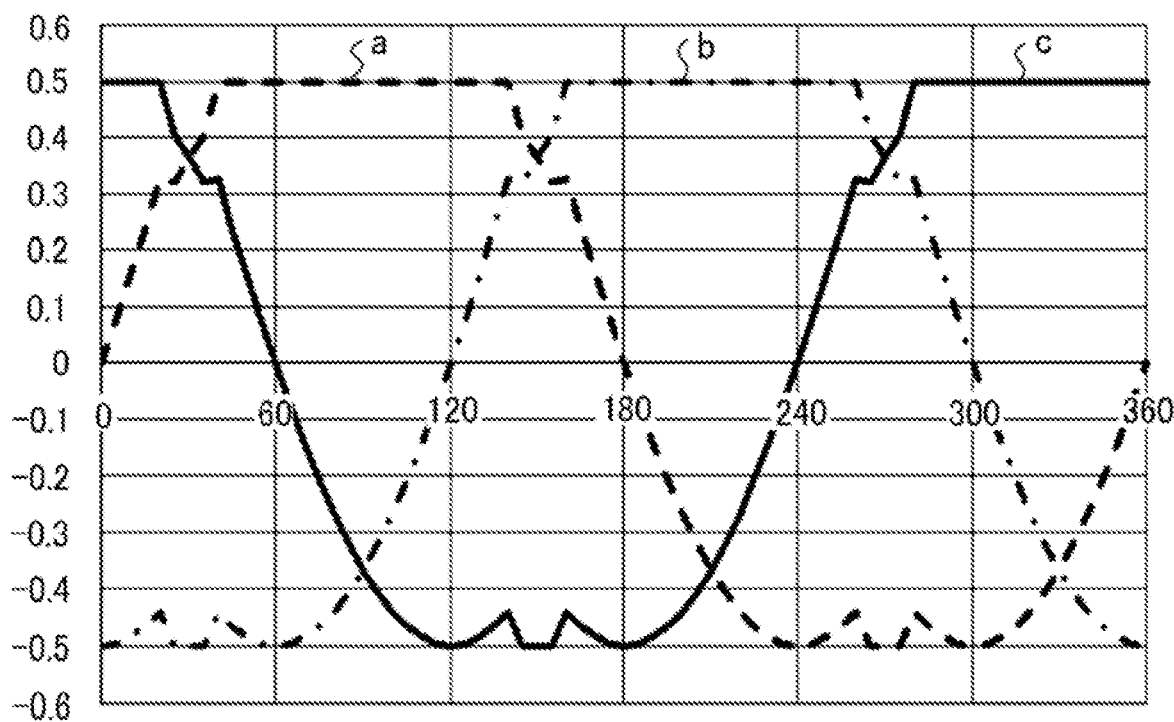
FIG. 19B is a drawing showing three-phase applied voltages wherein a modulation factor is 100% when fixing the second shift amount in the power conversion device according to the second embodiment.

In step S135b, corresponding to step S125b of FIG. 16, the second shift amount is fixed in such a way that the maximum phase $V_{max}c$ of the three-phase applied voltages is $0.5V_{dc}$. At this time, the three-phase applied voltages wherein the modulation factor K is 85% are shown in FIG. 19A, and the three-phase applied voltages wherein the modulation factor K is 100% are shown in FIG. 19B. In FIG. 19A and FIG. 19B, a broken line a indicates the three-phase applied voltage $V_{u12c}$, a dashed-dotted line b indicates the three-phase applied voltage $V_{v12c}$, and a solid line c indicates the three-phase applied voltage $V_{w12c}$.

Figure 20A:
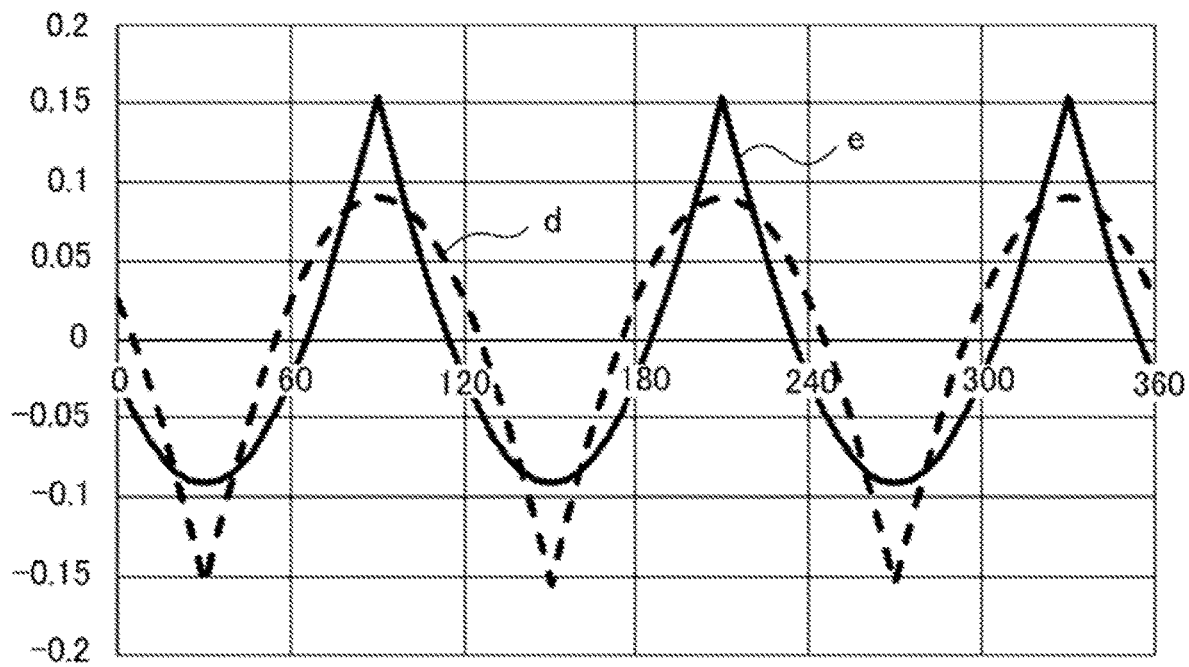
FIG. 20A is a drawing showing the first shift amount of FIG. 17A and FIG. 17B and the second shift amount of FIG. 19A and FIG. 19B.
Figure 20B:
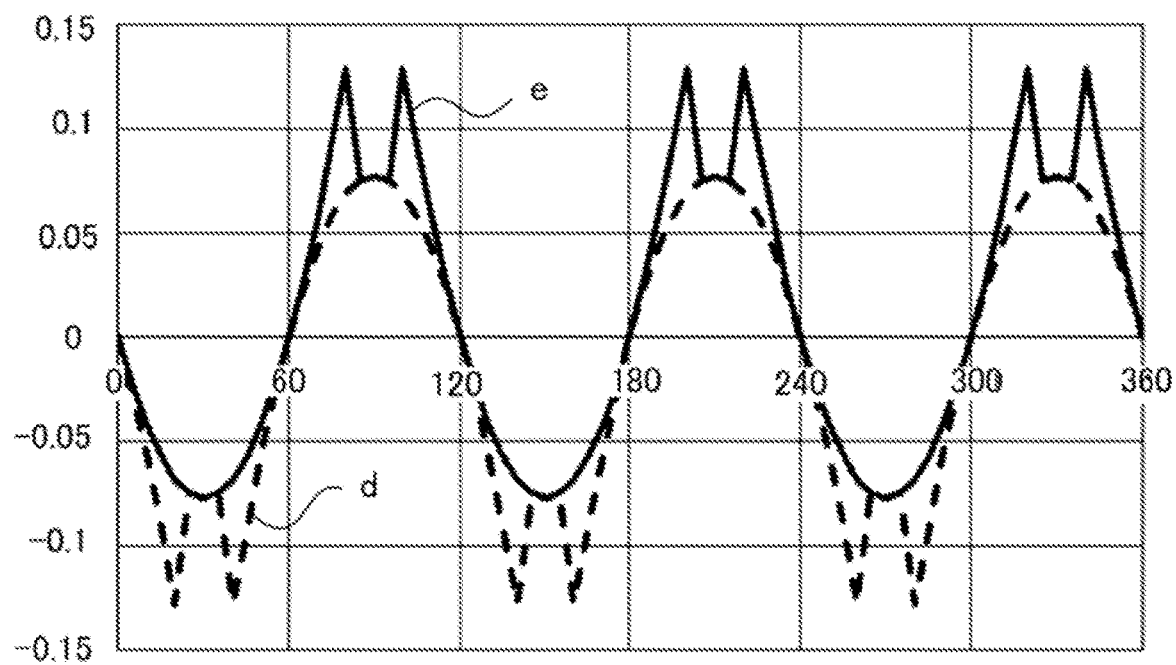
FIG. 20B is a drawing showing the first shift amount of FIG. 17A and FIG. 17B and the second shift amount of FIG. 19A and FIG. 19B.

FIG. 20A and FIG. 20B show the first shift amount of FIG. 17A and the second shift amount of FIG. 19A, and the first shift amount of FIG. 17B and the second shift amount of FIG. 19B.

A signal whose phase is shifted 180 degrees by inverting the sign of the first shift amount corresponds to the second shift amount, satisfying Expression (11), and an equalization of the amounts of heat generated by the high potential side switching elements Sup1, Svp1, and Swp1 and the amounts of heat generated by the low potential side switching elements Sun1, Svn1, and Swn1 in one electrical angle cycle can be realized. In FIG. 20A and FIG. 20B, a broken line d indicates the second shift amount Vofs2 and a solid line e indicates the first shift amount Vofs1.

Also, a first offset correction computation flowchart may be as in FIG. 21, adopting step S122c instead of step S122b of FIG. 16.

Figure 22A:
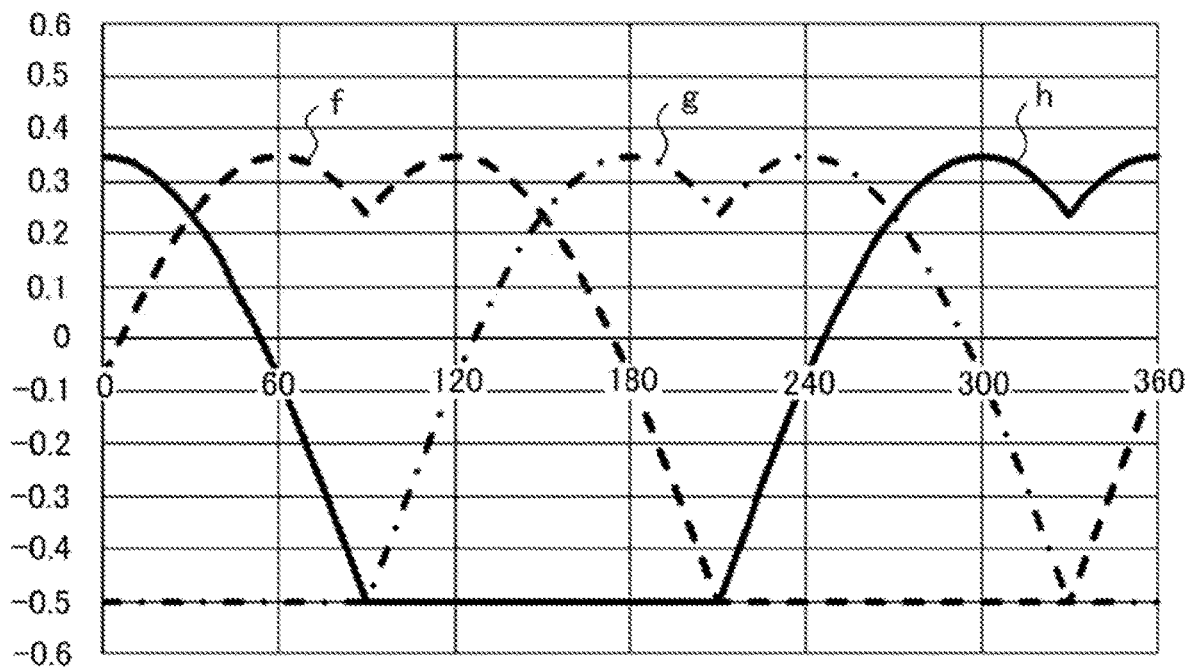
FIG. 22A is a drawing showing applied voltage waveforms when the second shift amount is provided in such a way that an applied voltage of a minimum phase of three-phase applied voltages is a minimum value of a carrier signal.
Figure 22B:
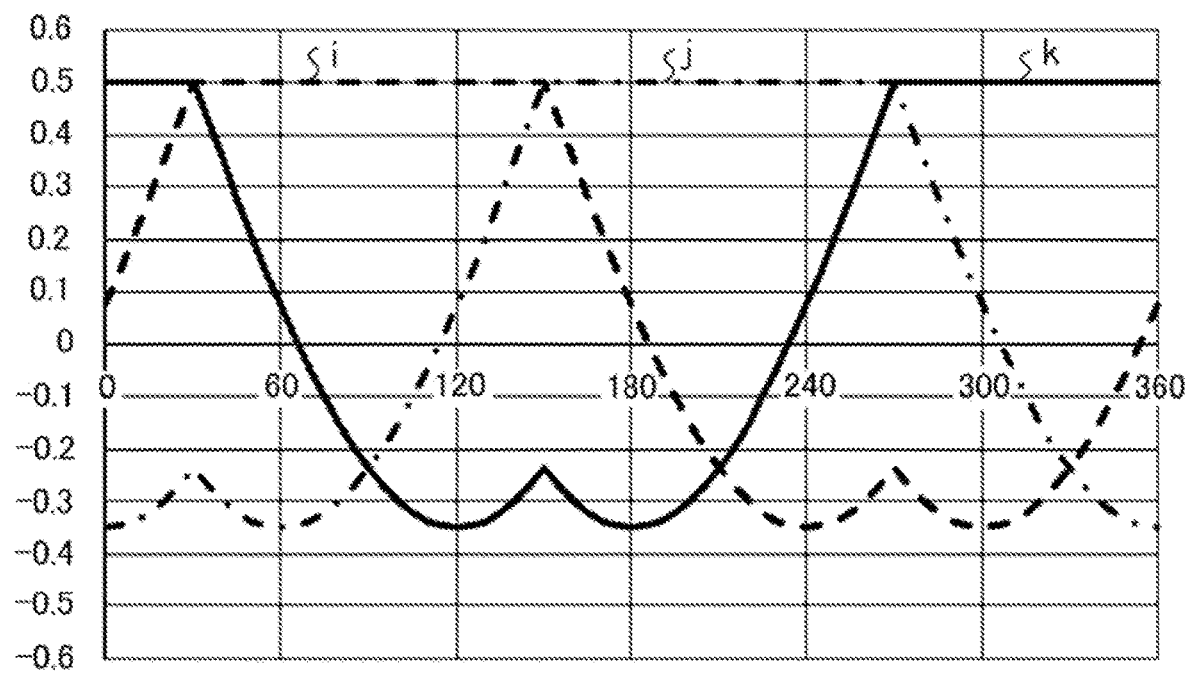
FIG. 22B is a drawing showing applied voltage waveforms when the second shift amount is provided in such a way that an applied voltage of a minimum phase of three-phase applied voltages is a minimum value of a carrier signal.

In step S122c of FIG. 21, the applied voltage of the maximum phase $V_{max1}$ of the three-phase applied voltages is a maximum value of the carrier signal C1, because of which a time from a switching of the minimum phase $V_{min1}$ to the detection timing $t_s$ is maximized, and current detection accuracy can be increased. It is sufficient that a second shift amount is provided in such a way that the applied voltage of the minimum phase $V_{min1}$ is a minimum value of the carrier signal C1. Applied voltage waveforms in a case wherein the minimum applied voltage ratio $K_s$ is $-0.4$ and the modulation factor K is 0.85 at this time are shown in FIG. 22A and FIG. 22B. In FIG. 22A, a broken line f indicates the three-phase applied voltage $V_{u12c}$, a dashed-dotted line g indicates the three-phase applied voltage $V_{v12c}$, and a solid line h indicates the three-phase applied voltage $V_{w12c}$. Also, in FIG. 922B, a broken line i indicates the three-phase applied voltage $V_{u11c}$, a dashed-dotted line j indicates the three-phase applied voltage $V_{v11c}$, and a solid line k indicates the three-phase applied voltage $V_{w11c}$.

Figure 23:
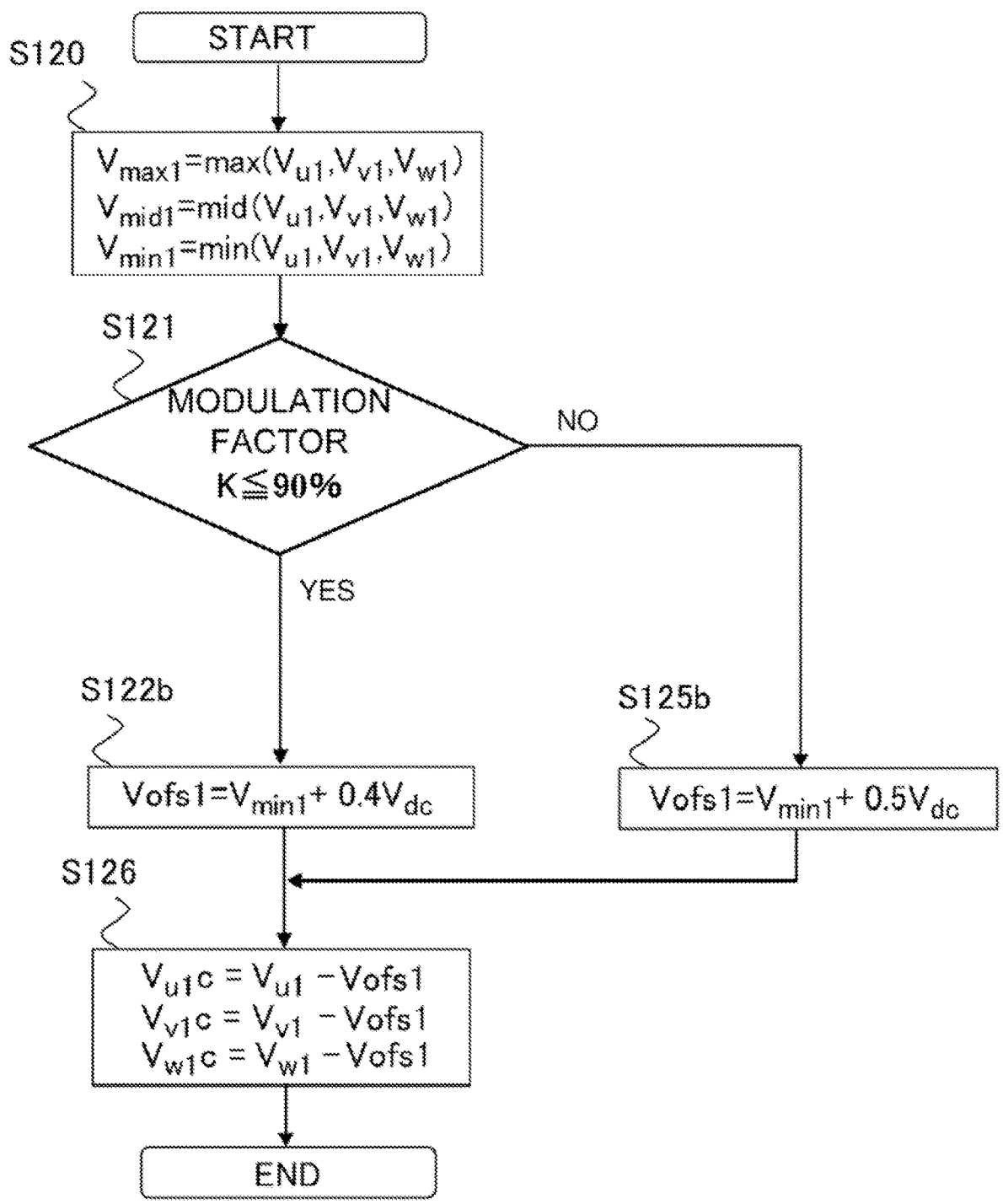
FIG. 23 is a flowchart illustrating still another computation of the first offset correction in the power conversion device according to the second embodiment.

Also, as an electrical angle changing in a carrier wave cycle is large when the modulation factor K is high, a time spent in a region in which the difference between maximum phase and intermediate phase voltage commands is small is short, because of which a first offset correction computation flowchart may be as in FIG. 23, omitting step S123b of FIG. 16.

When the modulation factor K is greater than the third control value $K_3$ provided at $0.5-K_s$, one phase's worth of switching can be stopped by the minimum value of the carrier signal C1 being adopted, because of which currents of one or more phases can be detected accurately, while restricting current detection errors caused by switching noise in other phases. Also, a reduction of a processing load can be achieved by reducing conditional branching.

Figure 24A:
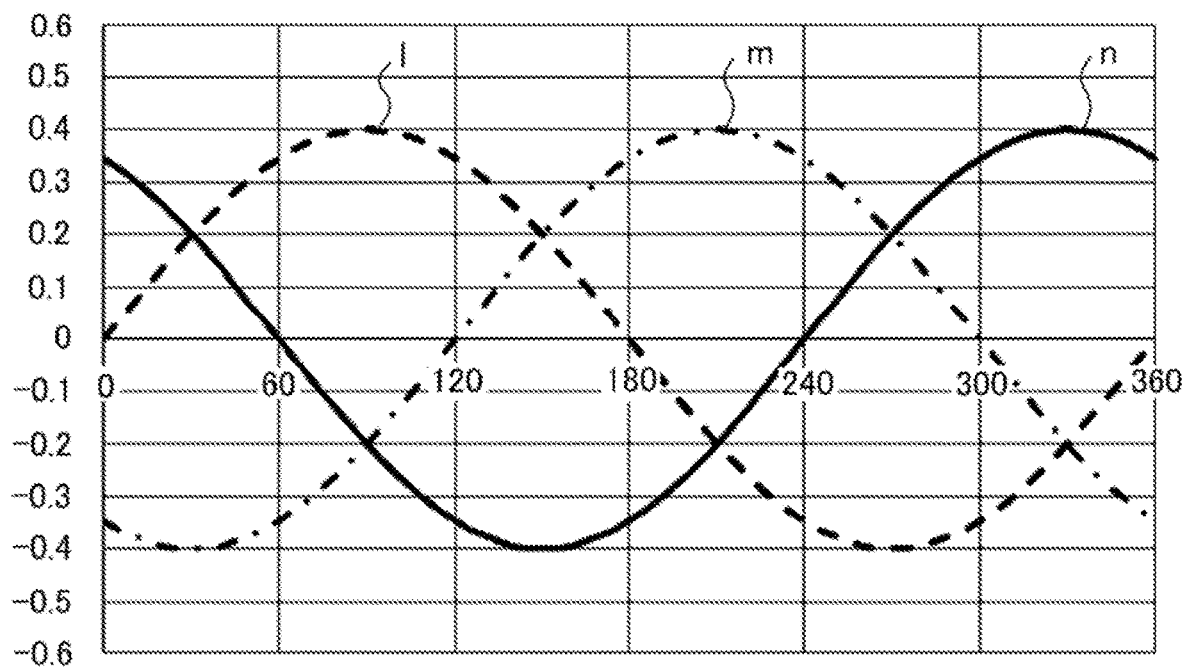
FIG. 24A is a drawing of applied voltage waveforms in a case wherein a maximum value of an applied voltage is such that current can be detected is 0.4, and a modulation factor is $2\sqrt{3}/5$, in the power conversion device according to the second embodiment.
Figure 24B:
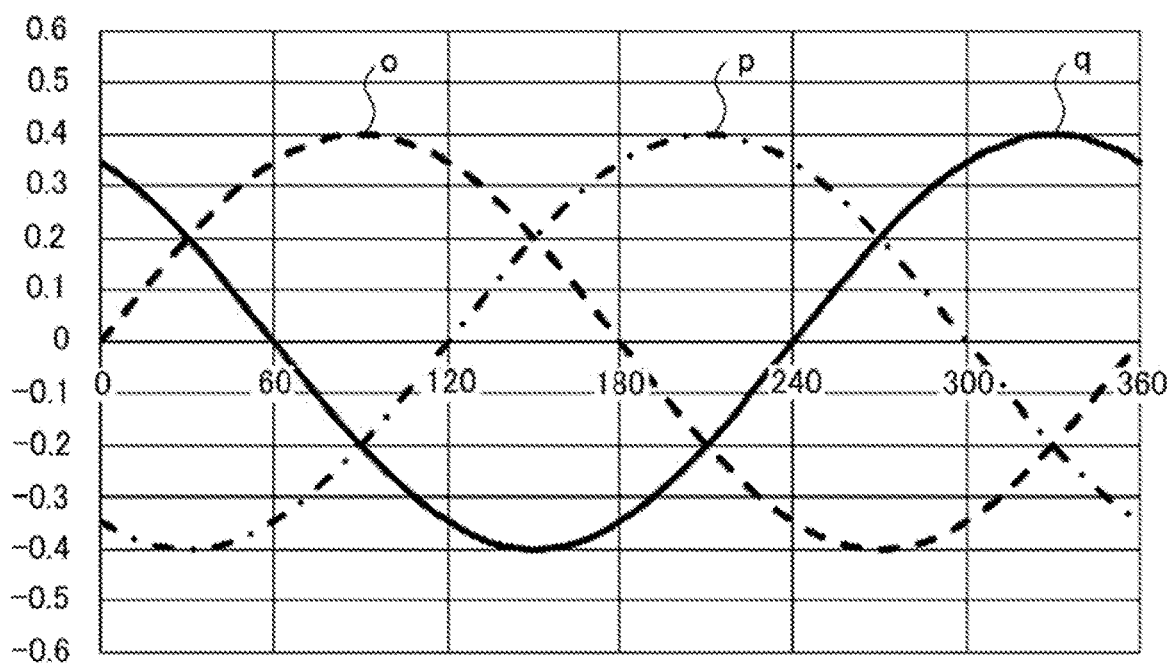
FIG. 24B is a drawing of applied voltage waveforms in a case wherein a maximum value of an applied voltage is such that current can be detected is 0.4, and a modulation factor is $2\rightarrow 3/5$, in the power conversion device according to the second embodiment.

Also, when the modulation factor K is low, voltage command amplitude is small, and there is freedom of choice in a first shift amount. Therefore, the first shift amount may be zero when the modulation factor K is equal to or less than the first control value $K_1$. In order to carry out current detection accurately, it is necessary that the minimum phase applied voltage is equal to or greater than the minimum applied voltage $K_s V_{dc}$, because of which it is sufficient that the first control value $K_1$ satisfies the following Expression (19). When a second shift amount is also zero, an equalization of generated heat amounts can be achieved. Applied voltage waveforms in a case wherein the minimum applied voltage ratio $K_s$ is 0.4 and the modulation factor K is $2\sqrt{3}/5$ at this time are shown in FIG. 24A and FIG. 24B. $V_{u11}c$, $V_{v11}c$, and $V_{w11}c$ obtained by the first offset correction and $V_{u12}c$, $V_{v12}c$, and $V_{w12}c$ obtained by the second offset correction are equal. In FIG. 24A, a broken line l indicates the three-phase applied voltage $V_{u12c}$, a dashed-dotted line m indicates the three-phase applied voltage $V_{v12c}$, and a solid line n indicates the three-phase applied voltage $V_{w12c}$. Also, in FIG. 24B, a broken line o indicates the three-phase applied voltage $V_{u11c}$, a dashed-dotted line p indicates the three-phase applied voltage $V_{v11c}$, and a solid line q indicates the three-phase applied voltage $V_{w11c}$.

$$K_1 \leq -\sqrt{3} K_s \quad (19)$$

Also, when the modulation factor K is less than or equal to the second control value $K_2$, the first shift amount is calculated based on the second control value $K_2$, as in the following Expression (20). That is, the first shift amount is fixed regardless of the modulation factor K at the time.

$$\left(\frac{K_2}{\sqrt{3}} - \frac{1}{2}\right) V_{dc} \quad (20)$$

As it is sufficient that the second shift amount is fixed in such a way that a sum of the second shift amount and the first shift amount is zero, the following Expression (21) is adopted.

$$\left(\frac{1}{2} - \frac{K_2}{\sqrt{3}}\right) V_{dc} \quad (21)$$

In order to carry out current detection accurately, it is necessary that the minimum phase applied voltage is equal to or greater than the minimum applied voltage $K_s V_{dc}$, because of which it is sufficient that the second control value $K_2$ satisfies the following Expression (22).

$$K_2 \leq \frac{\sqrt{3}}{2}\left(\frac{1}{2} - K_s\right) \quad (22)$$

Figure 25A:
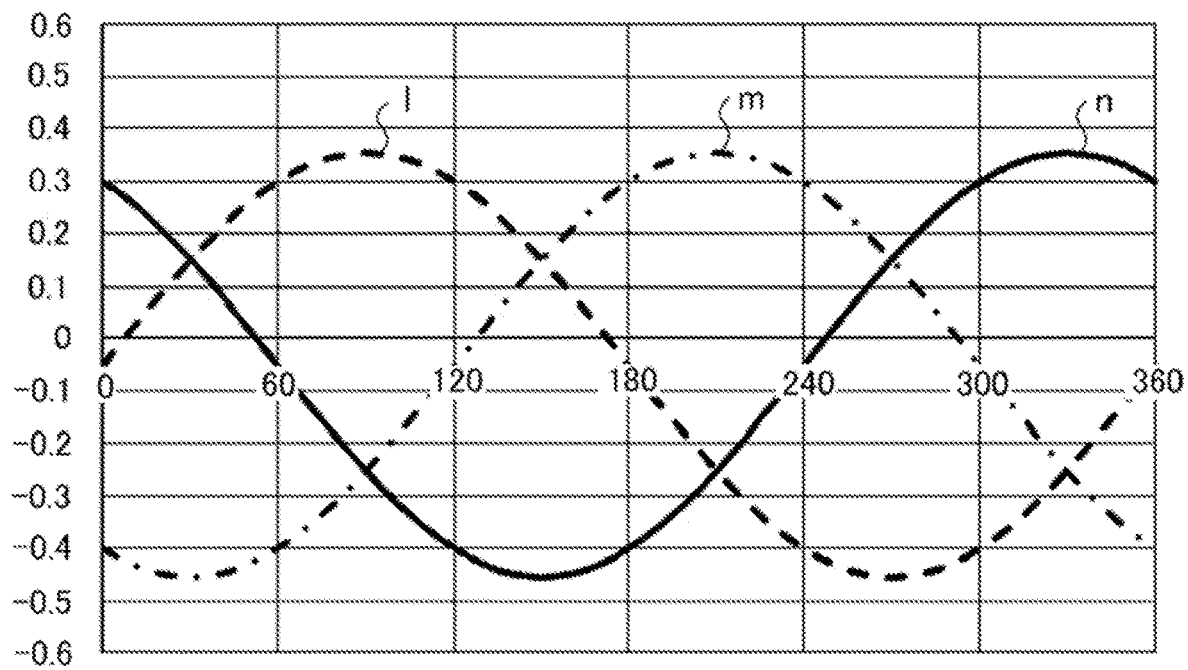
FIG. 25A is a drawing of applied voltage waveforms in a case wherein a maximum value of an applied voltage is such that current can be detected is 0.4, and a modulation factor is 0.7, in the power conversion device according to the second embodiment.
Figure 25B:
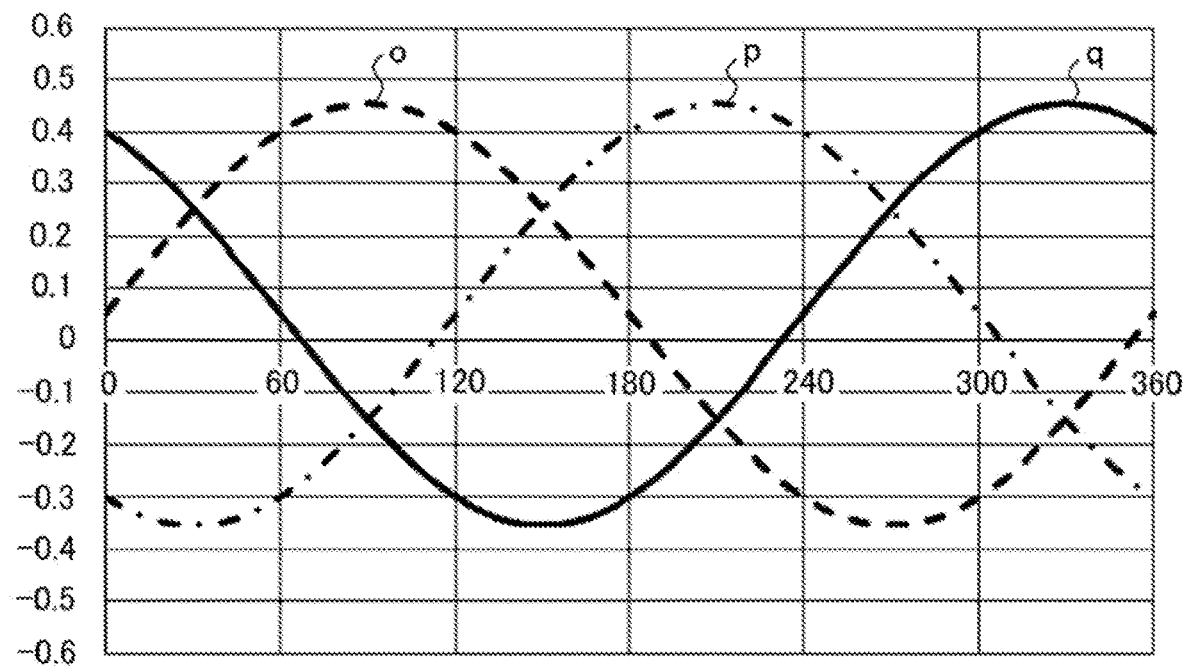
FIG. 25B is a drawing of applied voltage waveforms in a case wherein a maximum value of an applied voltage is such that current can be detected is 0.4, and a modulation factor is 0.7, in the power conversion device according to the second embodiment.

Applied voltage waveforms in a case wherein the minimum applied voltage ratio $K_s$ is −0.4 and the modulation factor K is 0.7 at this time are shown in FIG. 25A and FIG. 25B. When the shift amount is constant, as in Expression (21), a low-order fluctuation of a neutral point voltage can be restricted. In particular, the present configuration, which restricts neutral point voltage fluctuation, is excellent for determination accuracy in a configuration such that a failure or an abnormality is detected using an average value of acquired neutral point voltages or three-phase voltages. In FIG. 25A, a broken line l indicates the three-phase applied voltage $V_{u12c}$, a dashed-dotted line m indicates the three-phase applied voltage $V_{v12c}$, and a solid line n indicates the three-phase applied voltage $V_{w12c}$. Also, in FIG. 25B, a broken line o indicates the three-phase applied voltage $V_{u11c}$, a dashed-dotted line p indicates the three-phase applied voltage $V_{v11c}$, and a solid line q indicates the three-phase applied voltage $V_{w11c}$.

As heretofore described, the same advantages as in the first embodiment are obtained from the power conversion device according to the second embodiment.

Third Embodiment

Next, a third embodiment will be described. The third embodiment describes an example wherein the power conversion device described in the first embodiment or in the second embodiment is applied to an electric power steering device mounted in a vehicle.

Figure 26:
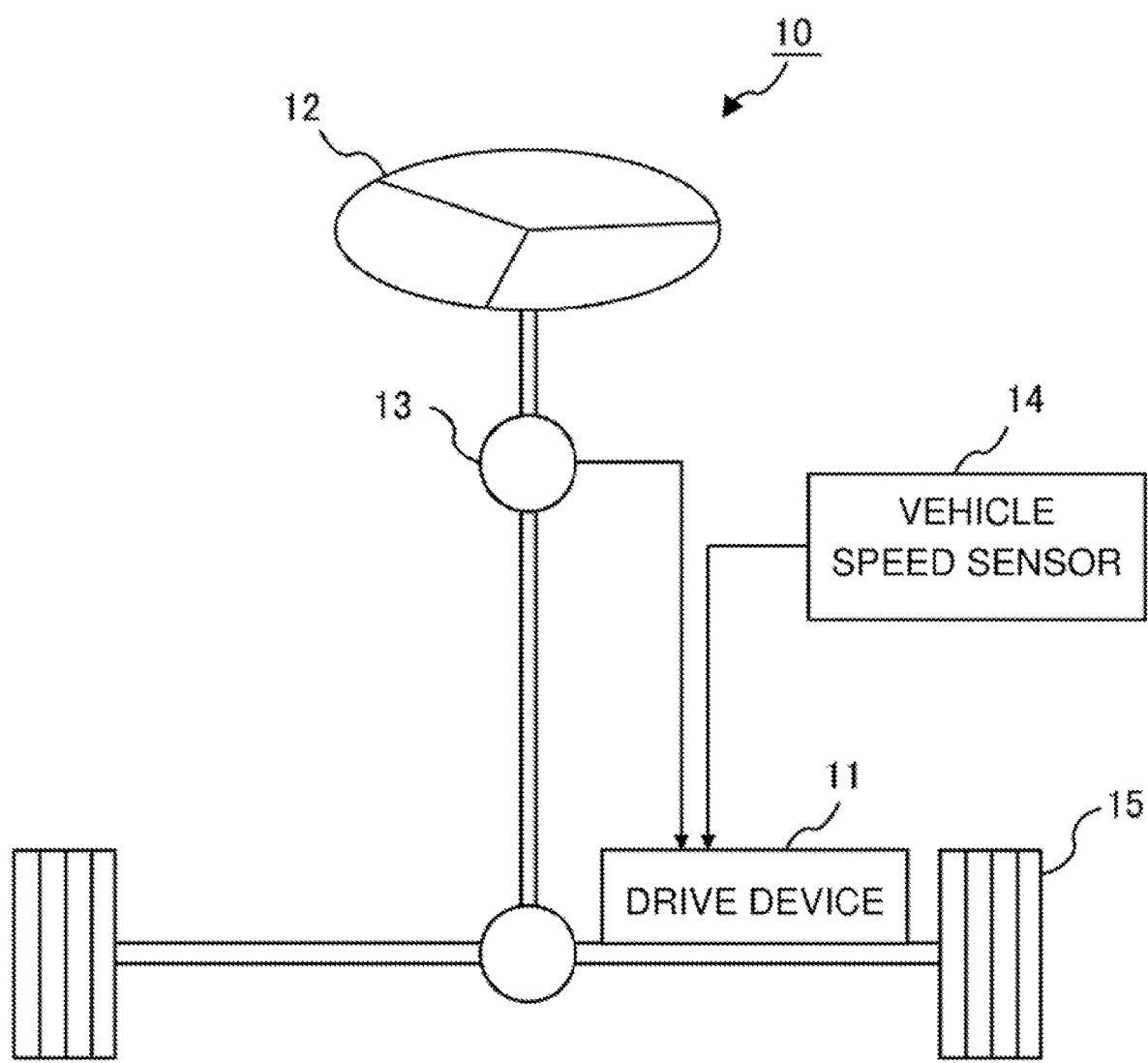
FIG. 26 is a block diagram showing an overall configuration of an electric power steering device according to a third embodiment.

FIG. 26 is a block diagram showing an overall configuration of an electric power steering device according to the third embodiment.

In FIG. 26, an electric power steering device 10 includes a drive device 11, and the drive device 11 is shown as a device that includes, in an integrated fashion, the power conversion device described in the first embodiment or in the second embodiment and the alternating current rotating machine 1 controlled by the power conversion device.

When a driver of the vehicle causes a steering mechanism of the vehicle to generate a steering torque using a steering wheel 12, a torque sensor 13 detects the steering torque, and outputs the steering torque to the drive device 11. Also, a vehicle speed sensor 14 detects a traveling speed of the vehicle, and outputs the traveling speed to the drive device 11.

The drive device 11, based on the steering torque input from the torque sensor 13 and the traveling speed input from the vehicle speed sensor 14, generates an assist torque that assists the steering torque from the alternating current rotating machine 1, and supplies the assist torque to a steering mechanism of a front wheel 15 of the vehicle. The drive device 11 may be configured in such a way as to generate assist torque based on an input other than the inputs from the torque sensor 13 and the vehicle speed sensor 14.

In this way, the power conversion device according to the first embodiment or the second embodiment can be applied to a control device of an electric power steering device that causes the alternating current rotating machine 1 to generate torque that assists a steering system steering torque. Because of this, an electric power steering device having a steering system wherein an overheating protection function is good, and there is little torque ripple or noise, can be obtained. A publicly known method such that steering torque is estimated from an applied voltage, a rotational speed, or the like, without using a torque sensor, may also be used. Also, a publicly known method such that control is carried out using an estimated road surface reaction force or the like, without using a vehicle speed sensor, may also be used.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1 alternating current rotating machine, 2 direct current power supply, 3 power converter, 4 smoothing capacitor, 5 control unit, 6 voltage command computer, 7 offset computer, 8 on/off signal generator, 9 current detector, 10 electric power steering device, 11 drive device, 12 steering wheel, 13 torque sensor, 14 vehicle speed sensor, 15 front wheel, U1, V1, W1 three-phase winding, Qup1, Qun1, Qvp1, Qvn1, Qwp1, Qwn1 on/off signal, Qup2, Qun2, Qvp2, Qvn2, Qwp2, Qwn2 on/off signal, Sup1, Svp1, Swp1 high potential side switching element, Sun1, Svn1, Swn1 low potential side switching element, Vofs1 first shift amount, Vofs2 second shift amount, $V_{u1}$, $V_{v1}$, $V_{w1}$ three-phase voltage command, $V_{u1}c$, $V_{v1}c$, $V_{w1}c$, $V_{u12}c$, $V_{v12}c$, $V_{w12}c$ three-phase applied voltage, C1 carrier signal.

The invention claimed is:

1. A power conversion device, comprising a direct current power supply that outputs a direct current voltage, connected to an alternating current rotating machine having n-phase windings, wherein n is three or more, the power conversion device comprising:
a power converter that has high potential side switching elements and low potential side switching elements, controls switching of the high potential side switching elements and the low potential side switching elements based on on/off signals, converts the direct current voltage into an alternating current voltage, and applies the alternating current voltage to the n-phase windings;
a current detector that is inserted in series with the high potential side switching elements or the low potential side switching elements and obtains a detected current of each phase; and
a control circuitry that computes a voltage command based on a current command of the alternating current rotating machine, and outputs the on/off signals by comparing an applied voltage, obtained by a first offset correction and a second offset correction with respect to the voltage command, and a carrier signal, wherein the control circuitry switches between the first offset correction and the second offset correction in a cycle shorter than an electrical angle cycle of the alternating current rotating machine,
the first offset correction is such that a first shift amount is fixed in such a way as to obtain an applied voltage such that at least n−2 phases among phase currents of the alternating current rotating machine can be detected, and the applied voltage is calculated by the first shift amount being subtracted equally from all the voltage commands, and
the second offset correction is such that a second shift amount is fixed in such a way that a sign of an average value in an electrical angle cycle is reversed with respect to that of an average value in an electrical angle cycle of the first shift amount, and the applied voltage is calculated by the second shift amount being subtracted equally from all the voltage commands.

2. The power conversion device according to claim 1, wherein the first offset correction is such that the first shift amount is fixed in such a way as to obtain an applied voltage that maximizes the number of phases that can be detected among the phase currents.

3. The power conversion device according to claim 1, wherein the sum of an average value in an electrical angle cycle of the first shift amount and an average value in an electrical angle cycle of the second shift amount is zero.

4. The power conversion device according to claim 1, wherein a switching cycle of the first offset correction and the second offset correction is a cycle of the carrier signal.

5. The power conversion device according to claim 1, wherein
the control circuitry computes the voltage command based on each phase current detected when the applied voltage generated by the first offset correction is output, and
does not update the voltage command when the applied voltage generated by the second offset correction is output.

6. The power conversion device according to claim 1, wherein,
when current can be detected at $K_m V_{dc}$ or less when the current detector is inserted in series with the low potential side switching elements, a ratio with respect to the direct current voltage of a maximum value when the applied voltage is an applied voltage such that current can be detected is $K_m$, and the direct current voltage is $V_{dc}$,
the first offset correction is such that the first shift amount is fixed in such a way as to obtain an applied voltage equal to or less than $K_m V_{dc}$.

7. The power conversion device according to claim 6, wherein the first shift amount is zero when a modulation factor is equal to or less than a first control value based on a range wherein current can be detected.

8. The power conversion device according to claim 7, wherein the first control value satisfies the following expression:

$$K_1 \leq \sqrt{3} K_m$$

herein, $K_1$ is a first control value of a modulation factor, and $K_m$ is a ratio with respect to a direct current voltage of a maximum value of an applied voltage such that current can be detected (a maximum applied voltage ratio).

9. The power conversion device according to claim 6, wherein the first shift amount is as in the following expression when a modulation factor is equal to or less than a second control value based on a range wherein current can be detected:

$$\left(\frac{1}{2} - \frac{K_2}{\sqrt{3}}\right)V_{dc}$$

herein, $K_2$ is a second control value of a modulation factor, and $V_{dc}$ is a direct current power supply direct current voltage.

10. The power conversion device according to claim 6, wherein, when a modulation factor is equal to or less than a third control value based on a range wherein current can be detected, the first offset correction is such that the first shift amount is fixed in such a way that an applied voltage computed in accordance with a voltage command of a minimum phase of three-phase applied voltages is equal to a minimum value of the carrier signal.

11. The power conversion device according to claim 6, wherein, when a modulation factor is greater than a third control value based on a range wherein current can be detected, the first offset correction is such that the first shift amount is fixed in such a way that an applied voltage computed in accordance with a voltage command of a maximum phase of three-phase applied voltages is a maximum value of the carrier signal.

12. The power conversion device according to claim 6, wherein, when a modulation factor is greater than a third control value based on a range wherein current can be detected, the first offset correction is such that the first shift amount is fixed in such a way that an applied voltage computed in accordance with a voltage command of a maximum phase of three-phase applied voltages is equal to or less than $K_m V_{dc}$, or is a maximum value of the carrier signal.

13. The power conversion device according to claim 1, wherein,
when current can be detected at $K_s V_{dc}$ or greater when the current detector is inserted in series with the high potential side switching elements, a ratio with respect to the direct current voltage of a minimum value when the applied voltage is an applied voltage such that current can be detected is $K_s$, and the direct current voltage is $V_{dc}$,
the first offset correction is such that the first shift amount is fixed in such a way as to obtain an applied voltage equal to or greater than $K_s V_{dc}$.

14. The power conversion device according to claim 13, wherein the first shift amount is zero when a modulation factor is equal to or less than a first control value based on a range wherein current can be detected.

15. The power conversion device according to claim 14, wherein the first control value satisfies the following expression:

$$K_1 \leq \sqrt{3}K_s$$

herein, $K_1$ is a first control value of a modulation factor, and
$K_s$ is a ratio with respect to a direct current voltage of a minimum value of an applied voltage such that current can be detected (a minimum applied voltage ratio).

16. The power conversion device according to claim 13, wherein the first shift amount is as in the following expression when a modulation factor is equal to or less than a second control value based on a range wherein current can be detected:

$$\left(\frac{K_2}{\sqrt{3}} - \frac{1}{2}\right)V_{dc}$$

herein, $K_2$ is a second control value of a modulation factor, and $V_{dc}$ is a direct current power supply direct current voltage.

17. The power conversion device according to claim 13, wherein, when a modulation factor is equal to or less than a third control value based on a range wherein current can be detected, the first offset correction is such that the first shift amount is fixed in such a way that an applied voltage computed in accordance with a voltage command of a maximum phase of three-phase applied voltages is equal to a maximum value of the carrier signal.

18. The power conversion device according to claim 13, wherein, when a modulation factor is greater than a third control value based on a range wherein current can be detected, the first offset correction is such that the first shift amount is fixed in such a way that an applied voltage computed in accordance with a voltage command of a minimum phase of three-phase applied voltages is a minimum value of the carrier signal.

19. The power conversion device according to claim 1, wherein, when a modulation factor is greater than a third control value based on a range wherein current can be detected, the first offset correction is such that the first shift amount is fixed in such a way that an applied voltage computed in accordance with a voltage command of a minimum phase of three-phase applied voltages is equal to or greater than $K_s V_{dc}$, or is a minimum value of the carrier signal.

20. An electric power steering device, comprising:
the power conversion device according to claim 1; and
a drive device including the alternating current rotating machine controlled by the power converter.

* * * * *